United States Patent
Choi et al.

(10) Patent No.: US 11,323,295 B2
(45) Date of Patent: May 3, 2022

(54) METHOD FOR TRANSMITTING SRS IN WIRELESS COMMUNICATION SYSTEM AND TERMINAL THEREFOR

(71) Applicant: LG ELECTRONICS INC., Seoul (KR)

(72) Inventors: Kukheon Choi, Seoul (KR); Jiwon Kang, Seoul (KR); Kyuseok Kim, Seoul (KR); Minki Ahn, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 16/486,825

(22) PCT Filed: Jan. 17, 2018

(86) PCT No.: PCT/KR2018/000785
§ 371 (c)(1),
(2) Date: Aug. 16, 2019

(87) PCT Pub. No.: WO2018/159939
PCT Pub. Date: Sep. 7, 2018

(65) Prior Publication Data
US 2019/0363911 A1    Nov. 28, 2019

Related U.S. Application Data

(60) Provisional application No. 62/465,809, filed on Mar. 1, 2017.

(51) Int. Cl.
*H04L 1/00* (2006.01)
*H04W 72/04* (2009.01)
(Continued)

(52) U.S. Cl.
CPC ........ *H04L 25/0226* (2013.01); *H04L 1/0026* (2013.01); *H04L 5/0051* (2013.01);
(Continued)

(58) Field of Classification Search
CPC . H04L 25/0226; H04L 1/0026; H04L 1/1861; H04L 5/0051; H04L 5/0091;
(Continued)

(56) References Cited

U.S. PATENT DOCUMENTS

2012/0063371 A1* 3/2012 He ................... H04L 5/0048
370/280
2013/0012252 A1 1/2013 Suzuki et al.
(Continued)

FOREIGN PATENT DOCUMENTS

CN    103069763    4/2013
CN    102934382    8/2016
(Continued)

OTHER PUBLICATIONS

State Intellectual Property Office of the People's Republic of China Application Serial No. 2018800149991, Office Action dated Jul. 5, 2021, 8 pages.
(Continued)

*Primary Examiner* — Candal Elpenord
(74) *Attorney, Agent, or Firm* — Lee Hong Degerman Kang Waimey

(57) ABSTRACT

A method for transmitting a sounding reference symbol (SRS) by a terminal in a wireless communication system may comprise the steps of: receiving, from a base station, SRS configuration information including information indicating an SRS sequence type for generation of an SRS sequence of the terminal; generating the SRS sequence on the basis of the indicated SRS sequence generating type; and transmitting an SRS, to which the generated SRS sequence
(Continued)

has been applied, from a corresponding resource to the base station.

9 Claims, 15 Drawing Sheets

(51) Int. Cl.
*H04W 76/27* (2018.01)
*H04W 80/02* (2009.01)
*H04L 25/02* (2006.01)
*H04L 5/00* (2006.01)

(52) U.S. Cl.
CPC ......... *H04W 72/042* (2013.01); *H04W 76/27* (2018.02); *H04W 80/02* (2013.01)

(58) Field of Classification Search
CPC .. H04L 5/0048; H04W 76/27; H04W 72/042; H04W 72/04; H04W 72/02; H04W 80/02
USPC .................................................. 370/329–330
See application file for complete search history.

(56) References Cited

U.S. PATENT DOCUMENTS

| | | | |
|---|---|---|---|
| 2013/0242911 A1* | 9/2013 | Heo ...................... | H04L 5/0048 370/329 |
| 2015/0222402 A1* | 8/2015 | Ouchi ............... | H04W 72/0413 370/329 |
| 2015/0223231 A1 | 8/2015 | Noh | |
| 2016/0081084 A1* | 3/2016 | Blankenship ..... | H04W 72/0446 370/329 |
| 2016/0277065 A1* | 9/2016 | Xie ....................... | H04L 5/0051 |
| 2017/0048717 A1* | 2/2017 | Yoo ................... | H04W 72/0453 |
| 2019/0053266 A1* | 2/2019 | Jiang .................... | H04W 76/27 |
| 2019/0053287 A1* | 2/2019 | Lin ..................... | H04J 13/0062 |
| 2019/0215110 A1* | 7/2019 | Yang ..................... | H04W 76/27 |
| 2019/0349124 A1* | 11/2019 | Tang ..................... | H04L 5/0082 |
| 2020/0119893 A1* | 4/2020 | Zhang .................. | H04L 5/0057 |

FOREIGN PATENT DOCUMENTS

| | | |
|---|---|---|
| CN | 106256108 | 11/2019 |
| EP | 2424285 | 2/2012 |
| EP | 2733999 | 5/2014 |
| WO | 2011144131 | 11/2011 |

OTHER PUBLICATIONS

Panasonic, "Discussion on SRS transmission for NR," R1-1702298, 3GPP TSG RAN WG1 Meeting #88, Feb. 2017, 4 pages.
Nokia et al., "UL SRS design considerations in NR," R1-1703183, 3GPP TSG RAN WG1 Meeting #88, Feb. 2017, 6 pages.
PCT International Application No. PCT/KR2018/000785, Written Opinion of the International Searching Authority dated Apr. 23, 2018, 19 pages.
Zte, et al., "Discussion on SRS design for NR", 3GPP TSG RAN WG1 Meeting #88, R1-1701818, Feb. 2017, 3 pages.
Ericsson, "On SRS design", 3GPP TSG RAN WG1 Meeting #88, R1-1703222, Feb. 2017, 9 pages.
Qualcomm, "Discussion on SRS Design", 3GPP TSG RAN WG1 Meeting #88, R1-1702618, Feb. 2017, 12 pages.
LG Electronics, "Considerations on NR SRS design", 3GPP TSG RAN WG1 Meeting #88, R1-1702465, Feb. 2017, 4 pages.
Sony, "Views on multiple SRS resource setting for NR", 3GPP TSG RAN WG1 Meeting #88, R1-1703135, Feb. 2017, 4 pages.
European Patent Office Application Serial No. 18761154.6, Search Report dated Dec. 18, 2020, 8 pages.
The State Intellectual Property Office of the People's Republic of China Application Serial No. 201880014999.1, Notice of Allowance dated Nov. 2, 2021, 7 pages.
"The research of channel detection technique based on sounding reference signal in LIE system", 2013, 64 pages.

* cited by examiner

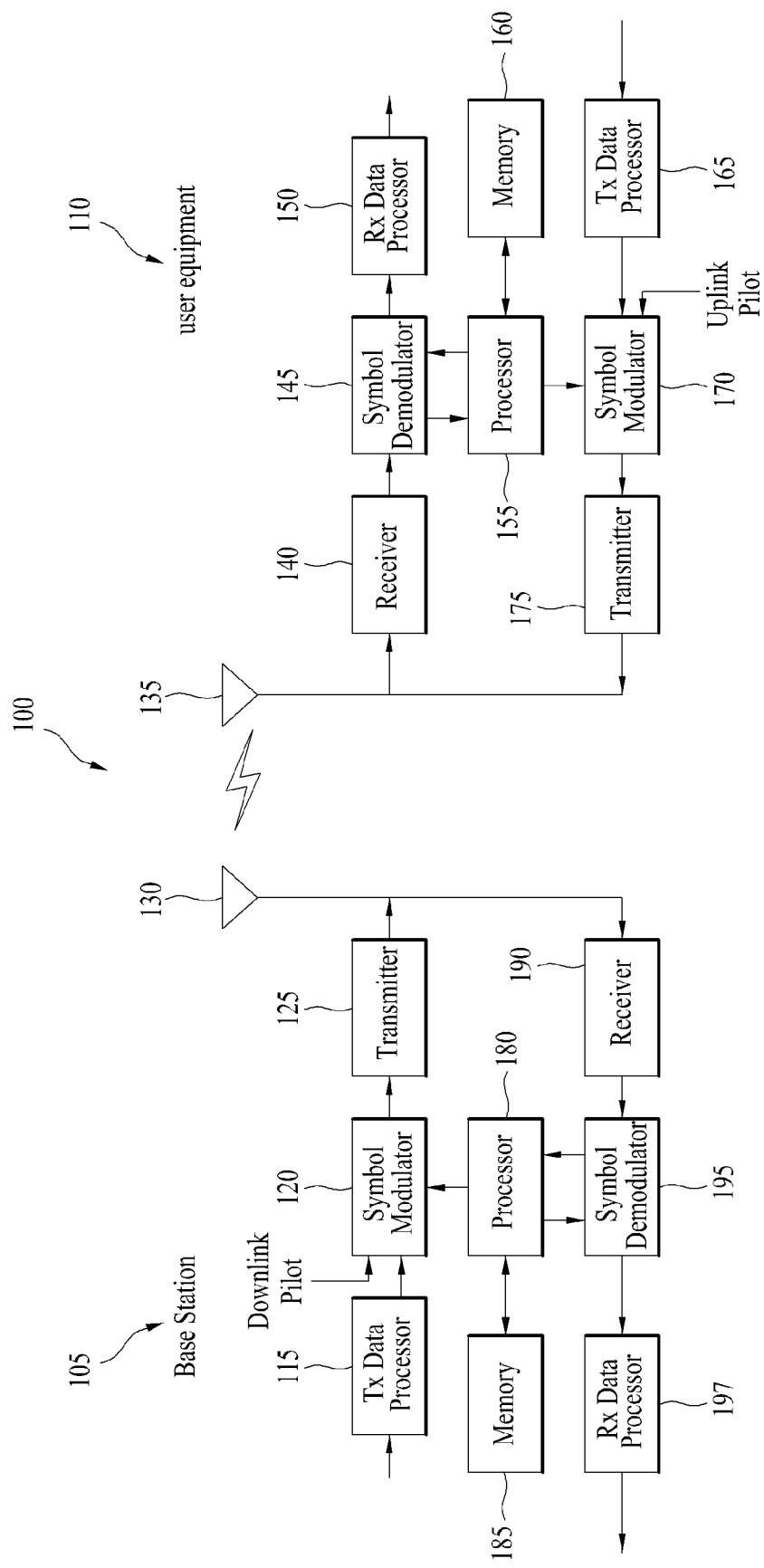

frequency

FIG. 9
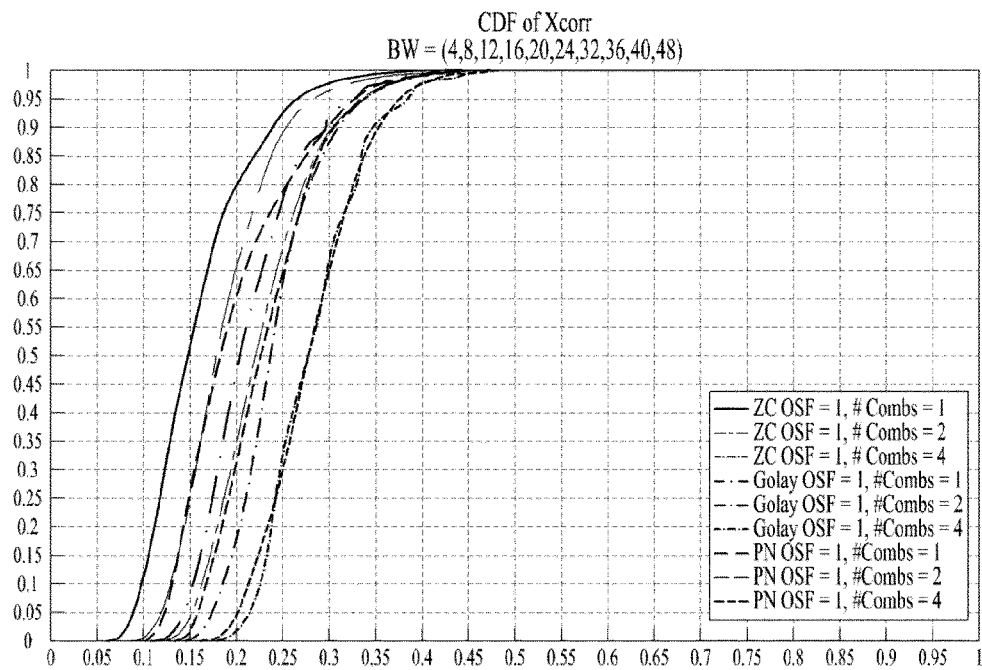
(a) Cross-correlation evaluation
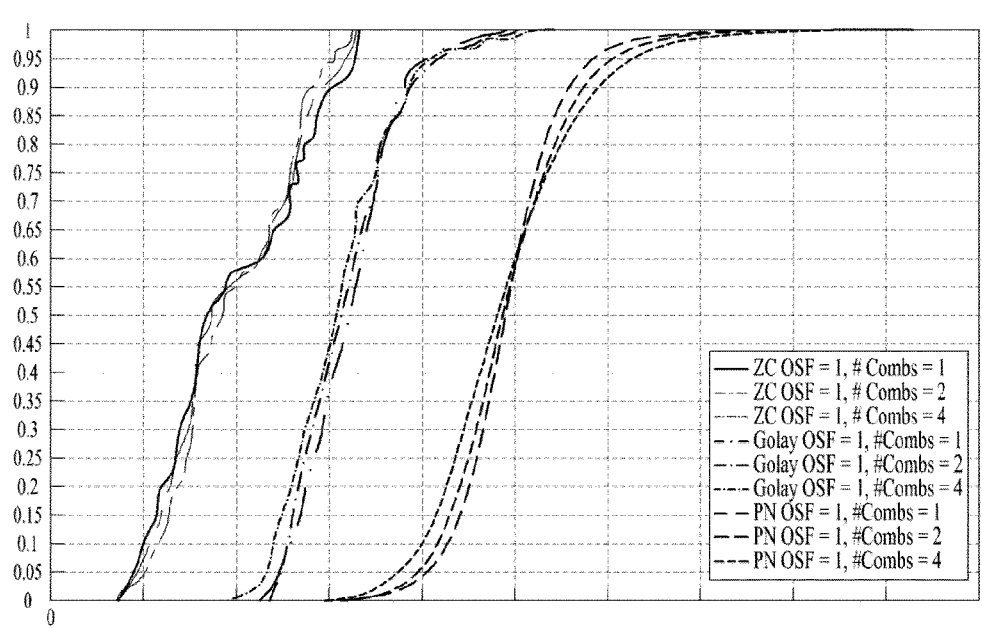
(b) cubic-Metric evaluation

METHOD FOR TRANSMITTING SRS IN WIRELESS COMMUNICATION SYSTEM AND TERMINAL THEREFOR

CROSS-REFERENCE TO RELATED APPLICATIONS

This application is the National Stage filing under 35 U.S.C. 371 of International Application No. PCT/KR2018/000785, filed on Jan. 17, 2018, which claims the benefit of U.S. Provisional Application No. 62/465,809, filed on Mar. 1, 2017 the contents of which are all hereby incorporated by reference herein in their entireties.

TECHNICAL FIELD

The present invention relates to wireless communication, and more particularly, to a method for transmitting an SRS in a wireless communication system and a terminal therefor.

BACKGROUND ART

With the introduction of a new radio access technology (RAT) system, as more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE

Technical Problem

An object of the present invention is to provide a method for transmitting an SRS by a terminal in a wireless communication system.

Another object of the present invention is to provide a terminal for transmitting an SRS in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present invention, provided herein is a method for transmitting a Sounding Reference Symbol (SRS) by a UE in a wireless communication system, the method including receiving, from a base station, SRS configuration information including information indicating an SRS sequence type for generation of an SRS sequence of the UE, generating an SRS sequence based on the indicated SRS sequence generation type, and transmitting, to the base station, an SRS on a corresponding resource, wherein the generated SRS sequence is applied to the SRS.

The indicated SRS sequence generation type may be a first type for generating an SRS sequence in the same manner regardless of an SRS transmission position in an SRS bandwidth or a second type for generating the SRS sequence in different manners according to the SRS transmission position in the SRS bandwidth.

The method may further include transmitting, to the base station, strength information about a received signal or Channel Quality Information (CQI), wherein the SRS sequence generation type may be indicated based on the strength information about the received signal or the CQI.

When the indicated SRS sequence generation type is the second type, the SRS configuration information may include at least one of information about the SRS bandwidth, information about a resource position without an SRS allocated thereto, or information about a transmission comb offset value. The information about the resource position without the SRS allocated thereto may indicate an index of a Physical Resource Block (PRB) to which the SRS is not allocated.

The method may further include transmitting, to the base station, category information about the UE, wherein the category information about the UE may include at least one of information about uplink multiplexing supported by the UE, information about a transmission power supported by the UE, the number of multiple numerologies supported by the UE, or information about an uplink allocable bandwidth supported by the UE, wherein the SRS sequence generation type may be indicated based on category information about the UE.

The SRS configuration information may be received through Downlink Control Information (DCI), a MAC Control Element (CE), or a Radio Resource Control (RRC) signal.

When the UE is located at a cell edge, the indicated SRS sequence generation type may be the first type. When the UE is located at a center of a cell, the indicated SRS sequence generation type may be the second type.

In another aspect of the present invention, provided herein is a UE for transmitting a Sounding Reference Symbol (SRS) in a wireless communication system, the UE including a receiver configured to receive, from a base station, SRS configuration information including information indicating an SRS sequence type for generation of an SRS sequence of the UE, a processor configured to generate an SRS sequence based on the indicated SRS sequence generation type, and a transmitter configured to transmit, to the base station, an SRS on a corresponding resource, wherein the generated SRS sequence is applied to the SRS.

The indicated SRS sequence generation type may be a first type for generating an SRS sequence in the same manner regardless of an SRS transmission position in an SRS bandwidth or a second type for generating the SRS sequence in different manners according to the SRS transmission position in the SRS bandwidth.

The transmitter may be configured to transmit, to the base station, strength information about a received signal or channel quality information (CQI), wherein the SRS sequence generation type may be indicated based on the strength information about the received signal or the CQI.

When the indicated SRS sequence generation type is the second type, the SRS configuration information may include at least one of information about the SRS bandwidth, information about a resource position without an SRS allocated thereto, or information about a transmission comb offset value. The information about the resource position without the SRS allocated thereto may indicate an index of a Physical Resource Block (PRB) to which the SRS is not allocated. The SRS configuration information may be received through Downlink Control Information (DCI), a MAC Control Element (CE), or a Radio Resource Control (RRC) signal.

Advantageous Effects

An SRS sequence generation type may be configured dynamically according to the position of a UE in a cell, transmission power, downlink channel state, and the like. Thereby, the PAPR constraint may be overcome and resources may be flexibly utilized.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention.

FIG. 1 is a block diagram for configurations of a base station 105 and a user equipment 110 in a wireless communication system 100.

FIG. 9 illustrates cross-correlation and cubic-metric evaluation of ZC, Golay, and PN sequences.

MODE FOR INVENTION

Figure 2A:
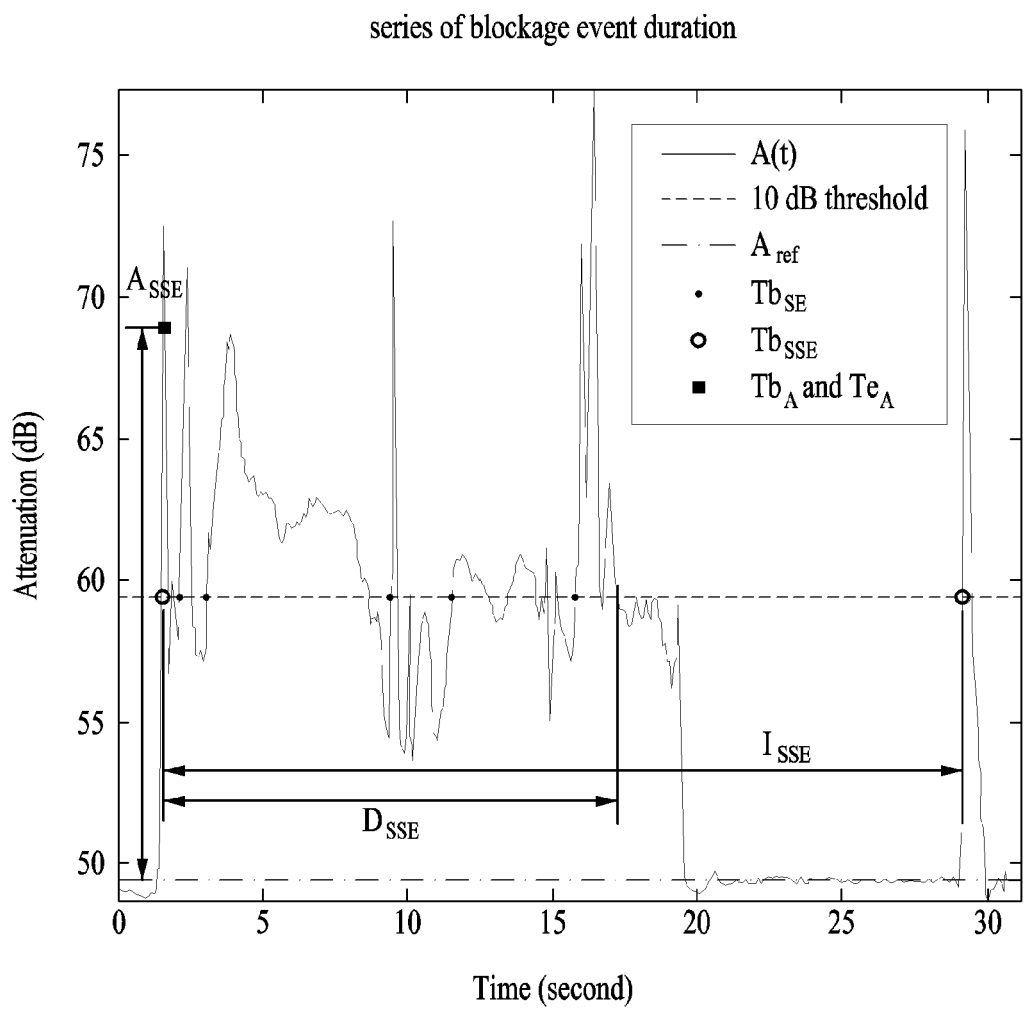
FIG. 2a shows the series of blockage event duration in Table 10 during which important blockages occur.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

First, Table 1 below shows details of SRS transmission in the 3GPP LTE/LTE-A system.

TABLE 1

A UE shall transmit Sounding Reference Symbol (SRS) on per serving cell SRS
resources based on two trigger types:
trigger type 0: higher layer signalling
trigger type 1: DCI formats 0/4/1A for FDD and TDD and DCI formats 2B/2C/2D for
TDD.
In case both trigger type 0 and trigger type 1 SRS transmissions would occur in the
same subframe in the same serving cell, the UE shall only transmit the trigger type 1
SRS transmission.
A UE may be configured with SRS parameters for trigger type 0 and trigger type 1 on
each serving cell. The following SRS parameters are serving cell specific and semi-
statically configurable by higher layers for trigger type 0 and for trigger type 1.
Transmission comb $\bar{k}_{TC}$, as defined in subclause 5.5.3.2 of [3] for trigger type 0
and each configuration of trigger type 1
Starting physical resource block assignment $n_{RRC}$, as defined in subclause 5.5.3.2 of
[3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as
defined in Table 8.2-1 and Table 8.2-2 for trigger type 0 and SRS periodicity
$T_{SRS, 1}$, and SRS subframe offset $T_{SRS, 1}$, as defined in Table 8.2-4 and Table 8.2-5 trigger
type 1
SRS bandwidth $B_{SRS}$, as defined in subclause 5.5.3.2 of [3] for trigger type 0 and
each configuration of trigger type 1
Frequency hopping bandwidth, $b_{hop}$, as defined in subclause 5.5.3.2 of [3] for trigger
type 0
Cyclic shift $n_{SRS}^{cs}$, as defined in subclause 5.5.3.1 of [3] for trigger type 0 and each
configuration of trigger type 1
Number of antenna ports $N_p$ for trigger type 0 and each configuration of trigger type 1
For trigger type 1 and DCI format 4 three sets of SRS parameters, srs-ConfigApDCI-
Format4, are configured by higher layer signalling. The 2-bit SRS request field [4] in
DCI format 4 indicates the SRS parameter set given in Table 8.1-1. For trigger type 1
and DCI format 0, a single set of SRS parameters, srs-ConfigApDCI-Format0, is
configured by higher layer signalling. For trigger type 1 and DCI formats
1A/2B/2C/2D, a single common set of SRS parameters, srs-ConfigApDCI-
Format1a2b2c, is configured by higher layer signalling. The SRS request field is 1 bit
[4] for DCI formats 0/1A/2B/2C/2D, with a type 1 SRS triggered if the value of the
SRS request field is set to '1'.
A 1-bit SRS request field shall be included in DCI formats 0/1A for frame structure
type 1 and 0/1A/2B/2C/2D for frame structure type 2 if the UE is configured with SRS
parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The 1st SRS parameter set configured by higher layers |
| '10' | The 2nd SRS parameter set configured by higher layers |
| '11' | The 3rd SRS parameter set configured by higher layers |

Table 3 below shows additional details of the SRS transmission in the 3GPP LTE/LTE-A system.

The serving cell specific SRS transmission bandwidths $C_{SRS}$ are configured by higher layers.
The allowable values are given in subclause 5.5.3.2 of [3].
The serving cell specific SRS transmission sub-frames are configured by higher layers.
The allowable values are given in subclause 5.5.3.3 of [3].
For a TDD serving cell, SRS transmissions can occur in UpPTS and uplink subframes of the
UL/DL configuration indicated by the higher layer parameter subframeAssignment for the serving cell.
When closed-loop UE transmit antenna selection is enabled for a given serving cell for a UE that
supports transmit antenna selection, the index $a(n_{SRS})$, of the UE antenna that transmits the SRS at
time $n_{SRS}$ is given by $a(n_{SRS}) = n_{SRS} \mod 2$, for both partial and full sounding bandwidth, and when
frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \mod 2 & \text{when K is even} \\ n_{SRS} \mod 2 & \text{when K is odd} \end{cases}, \beta = \begin{cases} 1 & \text{where K mod4 = 0} \\ 0 & \text{otherwise} \end{cases}$$

when frequency hopping is enabled (i.e. $b_{hop} < B_{SRS}$),
where values $B_{SRS}$, $b_{hop}$, $N_b$, and $n_{SRS}$ are given in subclause 5.5.3.2 of [3], and $$K = \prod_{b'=b_{hop}}^{B_{SRS}} N_b \left( \text{where } N_{b_{hop}} = 1 \text{ regardless of the } N_b \text{ value} \right), \text{except when a single}$$

SRS transmission is configured for the UE. If a UE is configured with more than one serving cell, the UE is not expected to transmit SRS on different antenna ports simultaneously.

A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode $2N_p \in \{0, 1, 2\}$ with two antenna ports configured for PUSCH and $N_p \in \{0, 1, 4\}$ with 4 antenna ports configured for PUSCH.

A UE configured for SRS transmission on multiple antenna ports of a serving cell shall transmit SRS for all the configured transmit antenna ports within one SC-FDMA symbol of the same subframe of the serving cell.

The SRS transmission bandwidth and starting physical resource block assignment are the same for all the configured antenna ports of a given serving cell.

A UE not configured with multiple TAGs shall not transmit SRS in a symbol whenever SRS and PUSCH transmissions happen to overlap in the same symbol.

For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.

If a UE is not configured with multiple TAGs, or if a UE is configured with multiple TAGs and SRS and PUCCH format 2/2a/2b happen to coincide in the same subframe in the same serving cell, The UE shall not transmit type 0 triggered SRS whenever type 0 triggered SRS and PUCCH format 2/2a/2b transmissions happen to coincide in the same subframe;

The UE shall not transmit type 1 triggered SRS whenever type 1 triggered SRS and PUCCH format 2a/2b or format 2 with HARQ-ACK transmissions happen to coincide in the same subframe;

The UE shall not transmit PUCCH format 2 without HARQ-ACK whenever type 1 triggered SRS and PUCCH format 2 without HARQ-ACK transmissions happen to coincide in the same subframe.

If a UE is not configured with multiple TAGs, or if a UE is configured with multiple TAGs and SRS and PUCCH happen to coincide in the same subframe in the same serving cell, The UE shall not transmit SRS whenever SRS transmission and PUCCH transmission carrying HARQ-ACK and/or positive SR happen to coincide in the same subframe if the parameter ackNackSRS-SimultaneousTransmission is FALSE;

For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.

Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.

A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.

In UpPTS, whenever SRS transmission instance overlaps with the PRACH region for preamble format 4 or exceeds the range of uplink system bandwidth configured in the serving cell, the UE shall not transmit SRS.

The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.

This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.

Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes.

For the SRS periodicity $T_{SRS}$ of 2 ms in TDD serving cell, two SRS resources are configured in a half frame containing UL subframe(s) of the given serving cell.

Type 0 triggered SRS transmission instances in a given serving cell for TDD serving cell with $T_{SRS} > 2$ and for FDD serving cell are the subframes satisfying $(10 \cdot nf + k_{SRS} - T_{offset}) \mod T_{SRS} = 0$, where for FDD $k_{SRS} = \{0, 1, \ldots 0\}$ is the subframe index within the frame, for TDD serving cell $k_{SRS}$ is defined in Table 8.2-3.

The SRS transmission instances for TDD serving cell with $T_{SRS} = 2$ are the subframes satisfying $k_{SRS}-T_{offset}$.

For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HargReferenceConfig-r12 as a downlink subframe unless the UE transmits PUSCH in the same subframe.

Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.

For the SRS periodicity $T_{SRS,1}$ of 2 ms in TDD serving cell, two SRS resources are configured in a half frame containing UL subframe(s) of the given serving cell.

A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.

-continued

A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.

A UE configured for type 1 triggered SRS transmission on serving cell c upon detection of a positive SRS request in subframe n of serving cell c shall commence SRS transmission in the first subframe satisfying $n + k$, $k > 4$ and $(10 \cdot n_f + k_{SRS} - T_{offset,1}) \mod T_{SRS,1} = 0$ for TDD serving cell c with $T_{SRS,1} > 2$ and for FDD serving cell c, $(k_{SRS} - T_{offset,1}) \mod 5 = 0$ for TDD serving cell c with $T_{SRS,1} = 2$ where for FDD serving cell c $k_{SRS} = \{0, 1, \ldots,\}$ is the subframe index within the frame $n_f$, for TDD serving cell c $k_{SRS}$ is defined in Table 8.2-3.

A UE configured for type 1 triggered SRS transmission is not expected to receive type 1 SRS triggering events associated with different values of trigger type 1 SRS transmission parameters, as configured by higher layer signalling, for the same subframe and the same serving cell.

For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.

A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | | 0 | 1 | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Table 10 below shows additional channel variation characteristics (blockage effects) of a channel above 6 GHz compared to a channel below 6 GHz.

Figure 2B:
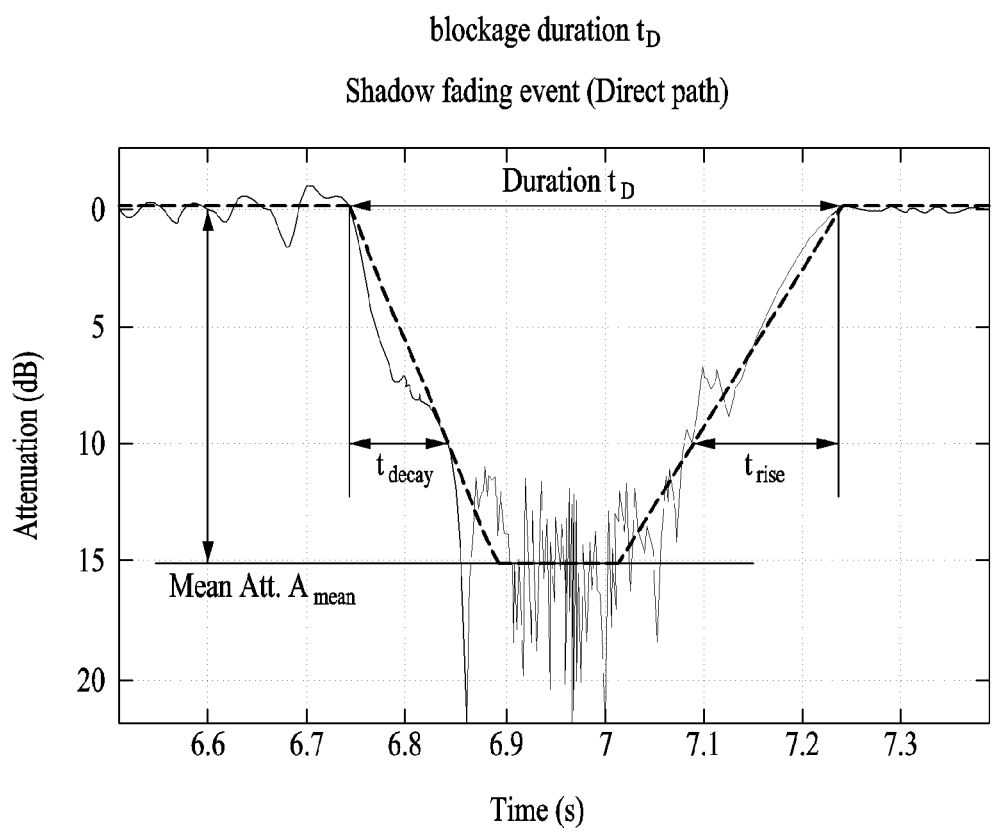
FIG. 2b shows the blockage duration ($t_D$) in Table 2.

FIG. 2 is a diagram illustrating blockage duration with reference to Table 10. Specifically, FIG. 2a shows the series of blockage event duration in Table 10 during which important blockages occur, and FIG. 2b shows the blockage duration ($t_D$) in Table 2. That is, the series of blockage event duration indicates the time during which important blockages occur, and $t_D$ indicates the period between occurrence of a blockage and the when blockage ends and the system goes back to a normal state.

Table 11 shows a pattern relationship between a UE and $t_{decay}$ and $t_{rising}$.

TABLE 11

| | Walking (0.6 m/s)[7] | Sprinting (10 m/s)[9] | Swift Hand swing (43 m/s) |
|---|---|---|---|
| $t_{decay}$, $t_{rising}$ (ms) | 150 ms (measure) | 9 ms (calculation) | 2.093 ms (calculation) |

Although Table 11 shows that a blockage change is basically estimated to about average 100 ms (the speed of a walking obstacle (4 km/h)), it can vary from 2 ms to hundreds of ms depending on UE's patterns and surrounding environments.

Analog Beamforming

In the millimeter wave (mmW) system, a short wavelength is used, and thus a plurality of antennas elements can be installed in the same area. In other words, the wavelength in the 30 GHz band is 1 cm, and accordingly a total of 64 (8×8) antenna elements may be installed at intervals of 0.5 lambda (wavelength) in a 2-dimensional array on a 4 by 4 cm panel. Therefore, in the mmW system, multiple antenna elements may be used to increase the beamforming (BF) gain to enhance the coverage or the throughput.

In this case, if each antenna element is provided with a transceiver unit (TXRU) to enable adjustment of transmit power and phase per antenna element, independent beam-

TABLE 10

| Ref. | Test description | Tx height | Rx height | Test frequency | Blockage rate relative parameter |
|---|---|---|---|---|---|
| [2] | One blocker moving (1 m/s) Horn (22.4 dBi, 12°) Patch (4.3 dBi/2.2 dBi, 58°) 4 blockers moving | 2.2/1.2 m | 1.2 m | 60 GHz | Series of Blockage event duration (threshold 5 dB) 780~1839 ms (Horn) 640~1539 ms (Patch) Series of Blockage event duration (threshold 5 dB) 688 ms (Horn, average) 278 ms (Patch, average) |
| [5] | 1~15 blockers moving The horns (22.4 dBi, 12° in azimuth, about 10° in elevation) The patches (about 3 dBi, 60° both in elevation and azimuth. The vertical polarization) | 1.58/2.77 m | 1.55 m | 60 GHz | Series of Blockage event duration (Threshold 10 dB)   (Threshold 20 dB) 300 ms (1~5 persons)   100 ms (1~5 persons) 350 ms (6~10 persons)   150 ms (6~10 persons) 450 ms (11~15 persons)   300 ms (11-15 persons) |
| [6] | — | — | — | 60 GHz | 93 ms (Mean Drop Rate) |
| [7] | One blocker moving (Walking speed) 20 dBi, 10° | 1.1 m | 0.75 m | 67 GHz | $t_D$ = 230 ms (average, Threshold 20 dB) |
| [8] | One blocker moving (Walking speed) 20 dBi, 10° | 1.1 m | 0.75 m | 67 GHz | $t_D$ = 370 ms ~820 ms $t_{decay}$ = 230 ms (mean), 92 ms (s.d) (Threshold 20 dB) $t_{rising}$ = 220 ms (mean), 100 ms (s.d) (Threshold 20 dB) | forming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming technique is disadvantageous in that frequency selective beamforming is not allowed because only one beam direction can be created over the full band.

As an intermediate form of digital BF and analog BF, hybrid BF with B TXRUs which are fewer than Q antenna elements may be considered. In the hybrid BF, the number of directions in which beams are allowed to be transmitted at the same time is limited to B or less, though it depends on how the B TXRUs and Q antenna elements are connected.

Figure 3A:
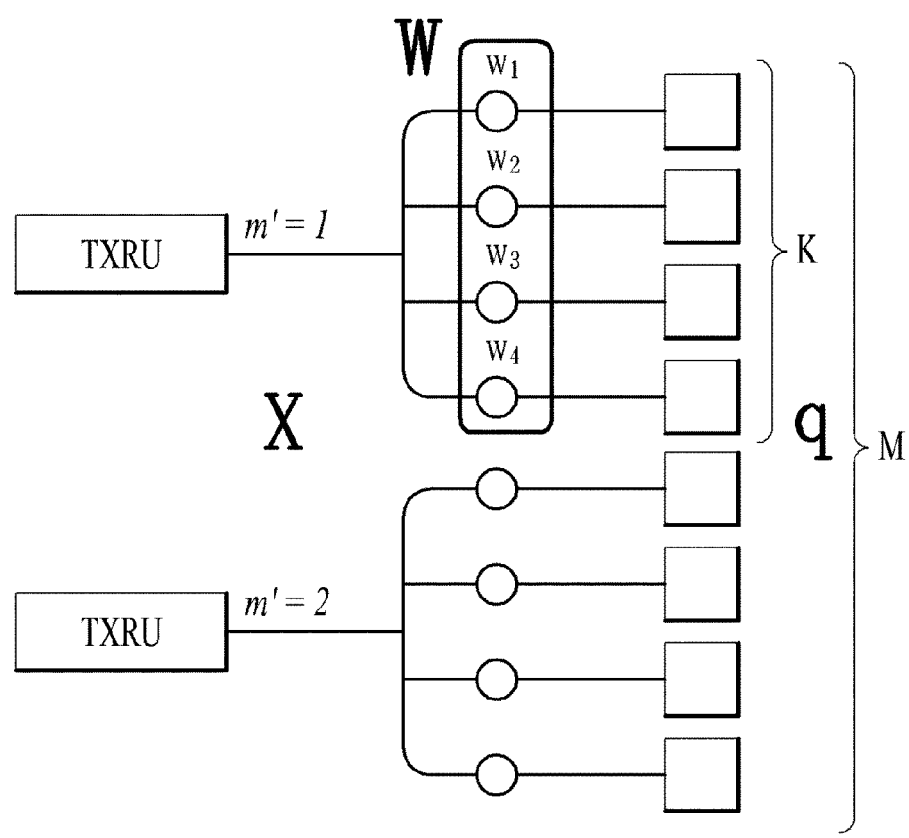
FIG. 3a is a diagram illustrating TXRU virtualization model option 1 (a sub-array model)
Figure 3B:
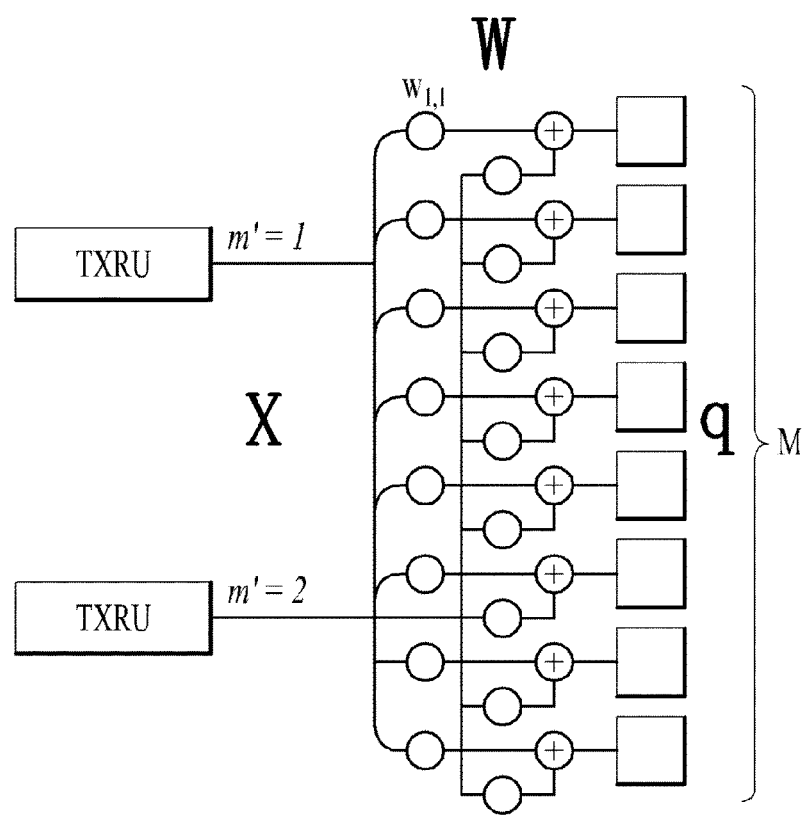
FIG. 3b is a diagram illustrating TXRU virtualization model option 2 (a full connection model).

FIG. 3A is a diagram illustrating TXRU virtualization model option 1 (a sub-array model), and FIG. 3B is a diagram illustrating TXRU virtualization model option 2 (a full connection model).

FIGS. 3A and 3B show representative examples of a method for connection of a TXRU and an antenna element. Here, the TXRU virtualization model shows the relationship between the output signal of the TXRU and the output signal of the antenna elements. FIG. 3A illustrates a scheme in which a TXRU is connected to a sub-array. In this case, the antenna elements are connected to only one TXRU. In contrast, FIG. 3B illustrates a scheme in which a TXRU is connected to all antenna elements. In this case, the antenna elements are connected to all TXRUs. In FIGS. 3A and 3B, W denotes a phase vector multiplied by an analog phase shifter. That is, the direction of analog beamforming is determined by W. Here, the mapping between the CSI-RS antenna ports and the TXRUs may be 1-to-1 or 1-to-many mapping.

Hybrid Beamforming

Figure 4:
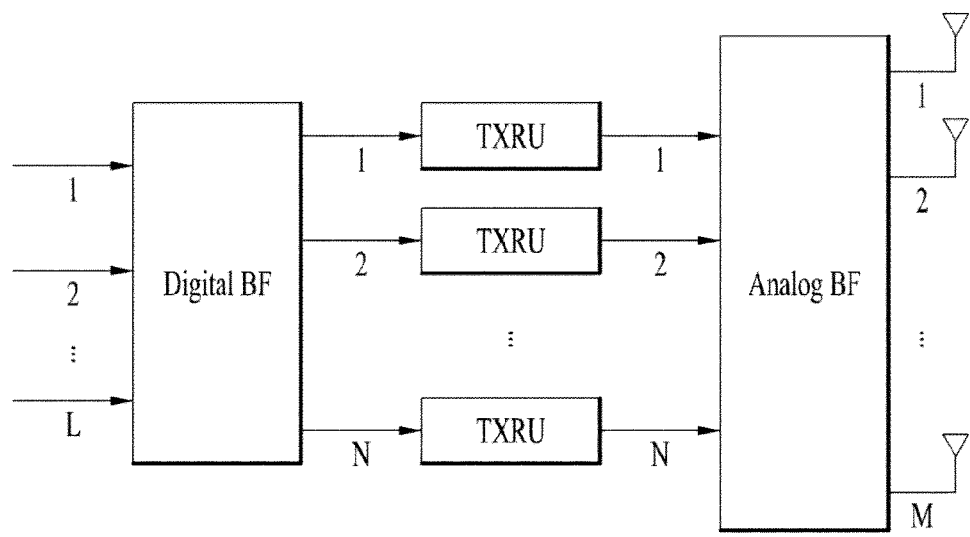
FIG. 4 is a block diagram for hybrid beamforming.

FIG. 4 is a block diagram for hybrid beamforming.

When multiple antennas are used in the New RAT system, a hybrid beamforming technique combining digital beamforming and analog beamforming may be used. In this case, analog beamforming (or RF beamforming) refers to an operation of performing precoding (or combining) in the RF stage. In the hybrid beamforming technique, each of the baseband stage and the RF stage may use precoding (or combining), thereby reducing the number of RF chains and the number of D/A (or a A/D) converters and exhibiting performance close to that of digital beamforming. As shown in FIG. 4, the hybrid beamforming structure may be represented by N transceiver units (TXRU) and M physical antennas for simplicity. Then, the digital beamforming for the L data layers to be transmitted from the transmitting side may be represented by an N by L matrix, and then N converted digital signals are converted into analog signals through the TXRUs and then subjected to analog beamforming represented by an M by N matrix.

FIG. 4 is an schematic diagram of a hybrid beamforming structure in terms of the TXRU and physical antennas. In FIG. 4, the number of digital beams is L, and the number of analog beams is N. Further, in the New RAT system, it is considered to design the base station to change analog beamforming on a symbol-by-symbol basis to support more efficient beamforming for a UE located in a specific area. Further, when N TXRUs and M RF antennas are defined as one antenna panel in FIG. 4, the New RAT system may introduce a plurality of antenna panels to which independent hybrid beamforming is applicable.

When a BS utilizes a plurality of analog beams, an analog beam which is advantageous for signal reception may differ among the UEs, and therefore a beam sweeping operation in which the BS changes a plurality of analog beams to be applied in a specific subframe (SF) on a symbol-by-symbol basis to allow all UEs to have a reception occasion may be considered.

Figure 5:
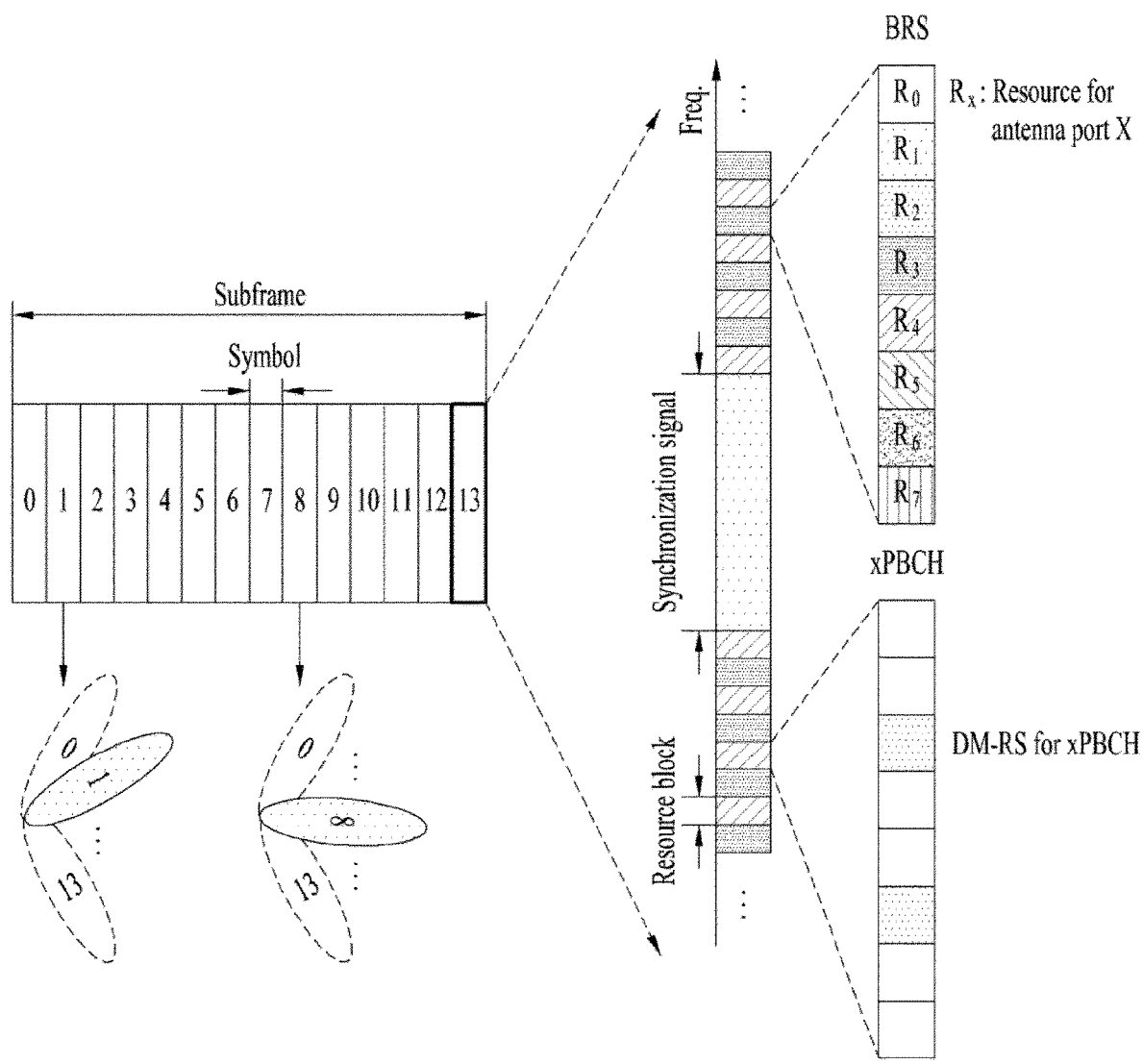
FIG. 5 is a diagram illustrating an example of beams mapped to BRS symbols in hybrid beamforming.

FIG. 5 is a diagram illustrating an example of beams mapped to BRS symbols in hybrid beamforming.

FIG. 5 illustrates the beam sweeping operation for a synchronization signal and system information in a downlink (DL) transmission process. In FIG. 5, a physical resource (or physical channel) on which the system information of the New RAT system is transmitted in a broadcast manner is referred to as a xPBCH (physical broadcast channel). Analog beams belonging to different antenna panels within one symbol may be transmitted simultaneously, and introduction of a beam RS (BRS) may be considered, the BRS is a reference signal (RS) transmitted by applying a single analog beam (corresponding to a specific antenna panel) as shown in FIG. 5 to measure a channel for each analog beam. The BRS may be defined for a plurality of antenna ports, and each antenna port of the BRS may correspond to a single analog beam. While the RS used to measure a beam is referred to as BRS in FIG. 5, it may be called by another name. In this case, unlike the BRS, the synchronization signal or the xPBCH may be transmitted by applying all analog beams in an analog beam group such that any UE can receive the synchronization signal or the xPBCH well.

Figure 6:
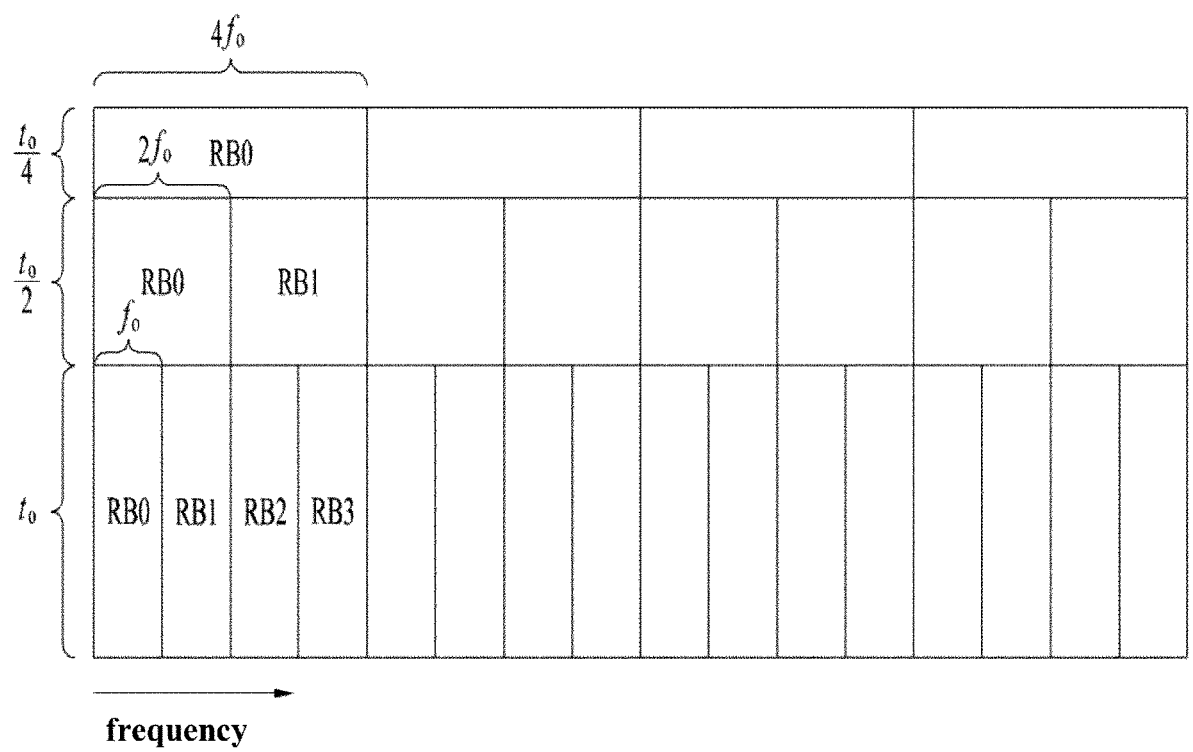
FIG. 6 is an exemplary diagram illustrating symbol/sub-symbol alignment between different numerologies.

FIG. 6 is an exemplary diagram illustrating symbol/sub-symbol alignment between different numerologies.

Features of New RAT (NR) Numerology

In the NR system, a method of supporting scalable numerology is considered. In other words, NR subcarrier spacing is expressed as (2n×15) kHz, where n is an integer. From the nested perspective, the above-mentioned subset or a superset (at least 15, 30, 60, 120, 240, and 480 kHz) is considered as the main subcarrier spacing. Symbol or sub-symbol alignment between different numerologies is supported by adjusting the numerologies to have the same CP overhead rate.

Also, numerology is determined in a structure in which the above-described time/frequency granularity is dynamically allocated according to the respective services (eMMB, URLLC, mMTC) and scenarios (high speed, etc.).

Bandwidth Dependent/Non-Dependent Sequence for Orthogonalization

The LTE system designs the SRS differently according to the sounding bandwidth. That is, a computer generated sequence is used for a sequence design with a length of 24 or less, and a Zadoff-Chu (ZC) sequence is used when the length is 36 (3 RBs) or more. The greatest advantage of the ZC sequence is that it exhibits low PAPR or low cubic metric and has ideal autocorrelation and low cross-correlation properties. However, in order to satisfy the above properties, the lengths of the required sequences (representing the sounding bandwidths) must be the same. Therefore, in order to support UEs having different sounding bandwidths, a method of allocating the UEs to different resource regions is needed. In order to minimize deterioration of channel estimation performance, IFDMA comb structures are configured to have different sounding bandwidths to support orthogonality of UEs that perform transmission simultaneously. If a transmission comb (TC) structure is used for a UE having a small sounding bandwidth, a sequence length that is less than the minimum sequence length with orthogonality (typically represented by length 24) may be given. Accordingly, TC is limited to 2. If the same TC is given on the same sounding resource, a dimension that provides orthogonality is needed, which employs CDM using cyclic shift.

There are sequences which have slightly lower PAPR and correlation performance than the ZC sequence but can be subjected to resource mapping regardless of the sounding bandwidth. Examples of such sequences include a Golay sequence and a pseudo random (PN) sequence. In the case of Golay sequences, when autocorrelation values of sequences a and b are $A_a$ and $A_b$, the sequences a and b are called a Golay complementary sequence pair if the sum of the autocorrelation values satisfies the following condition: $A_a+A_b=\delta(x)$).

Figure 7:
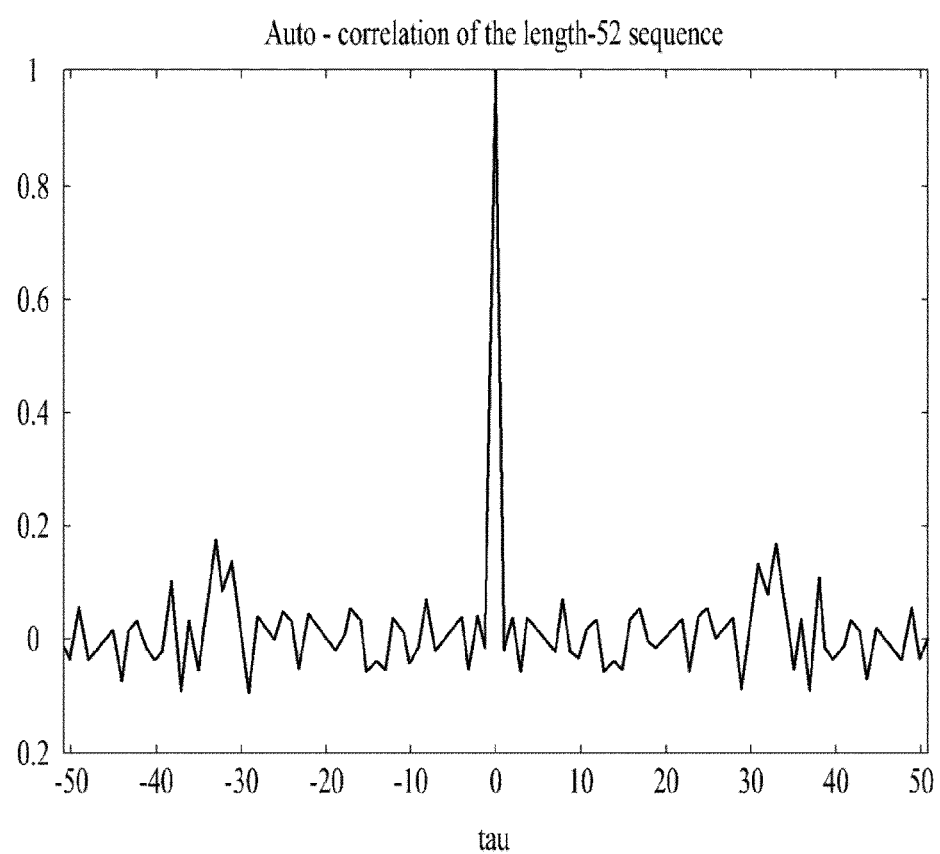
FIG. 7 illustrates performance of 52-length autocorrelation using two 26-length Golay Complementary Sequence pairs.

As an example, when Golay sequences a and b of length 26 are a=[1 −1 1 1 −1 −1 1 −1 −1 −1 −1 1 −1 1 −1 −1 −1 −1 1 1 −1 −1 −1 1 −1 1] and b=[−1 1 −1 −1 1 1 −1 1 1 1 1 −1 −1 −1 −1 −1 −1 −1 1 1 −1 −1 −1 1 −1 1], a length-52 sequence may be configured by concatenating the two sequences, and when 0 is mapped to 4 resource elements (REs) on both sides, the auto-correlation performance may be obtained as shown in FIG. 7. FIG. 7 shows the performance of 52-length autocorrelation using two 26-length Golay complementary sequence pairs.

Figure 8:
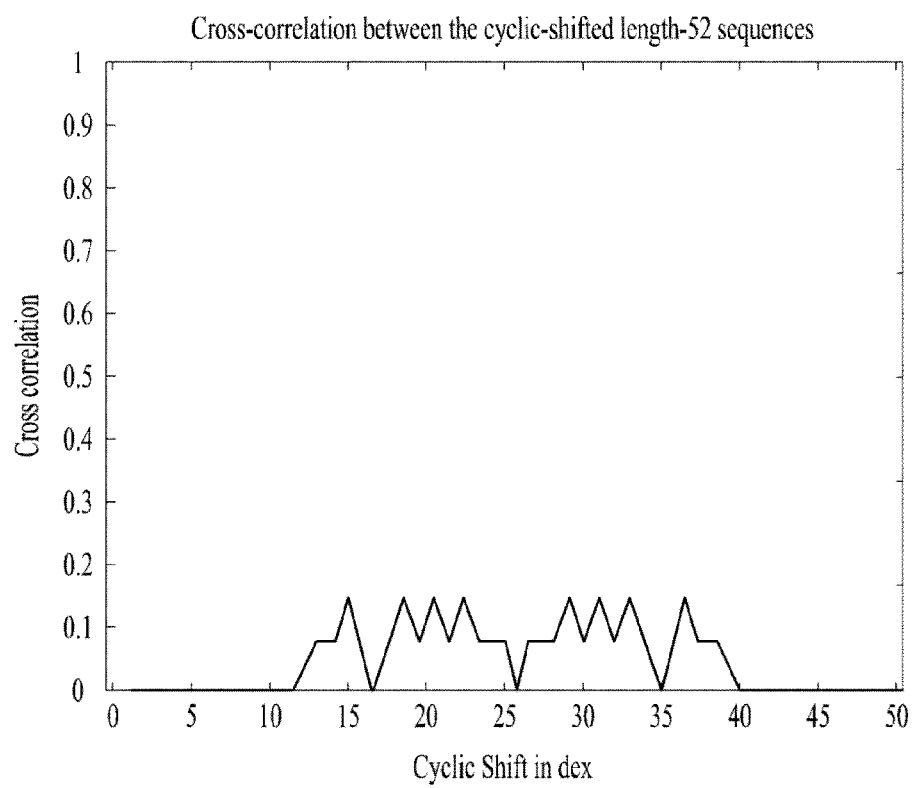
FIG. 8 illustrates cross-correlation between sequences having different CSs in a Golay sequence of length 52.

FIG. 8 illustrates cross-correlation between sequences having different CSs in a Golay sequence of length 52.

A plurality of Golay sequences may be generated by applying multiple cycle shifts (CS) to the sequence configured to have the length-52. Cross-correlation between Golay sequences subjected to different CSs is shown in FIG. 8.

FIG. 9 illustrates cross-correlation and cubic-metric evaluation of ZC, Golay, and PN sequences.

For the relationship between the ZC, Golay, and PN sequences, cubic metric (CM) and cross-correlation were calculated according to cases where TC is 1, 2, and 4, respectively, and the calculation results of the respective cases were compared with each other. The assumptions which are made for the evaluation are as follows.

The sounding bandwidth is set to 4, 8, 12, 16, 20, 24, 32, 36, and 48RB (based on LTE SRS design).

As in the LTE system, the 30 groups number $u=(f_{gh}(n_s)+f_{ss})mod30$ is determined as follows, and $(f^{gh}(n_s),f_{ss})$ determined based on cell ID. When the bandwidth is 4 RBs, one base sequence v is selected. For the other bandwidths, two base sequence numbers v are selected.

For the Golay sequence, a truncated binary Golay sequence with length 2048 in the 802.16m system was used, and a QPSK PN sequence is shown as an example of an independent bandwidth SRS design. In order to represent 30 groups in the ZC sequence, the Golay sequence was generated using 30 CSs, and 30 PN sequences were generated based on Matlab.

Evaluation was conducted with TC=1, 2 and 4.

For cubic metric evaluation, the oversampling factor (OSF) was set to 8 for better resolution.

Referring to FIG. 9(a), the ZC sequence exhibited higher cross correlation performance than the Golay sequence, which exhibited higher cross correlation performance than the PN sequence (ZC>Golay>PN). The ZC sequence exhibited higher CM performance than the Golay sequence, which exhibited higher CM performance than the PN sequence (ZC>Golay>PN). In terms of generation of an SRS sequence for UL transmission, the ZC sequence may be seen as exhibiting better performance as in the LTE system. However, in order to increase the degree of freedom of each UE in allocating the sounding bandwidth, the Golay sequence or the PN sequence may also be considered as a SRS sequence candidate of the New RAT system.

Table 12 below shows methods for generating SRS sequences.

TABLE 12

To down-select one method for NR SRS sequence generation based on at least the following alternatives:
Alt-1: SRS sequence is a function of the sounding bandwidth and does not depend on the sounding bandwidth position or the PRB position.
Sequence design and other design details are FFS.
Alt-2: SRS sequence is a function of the sounding bandwidth position or the PRB position.
Sequence design and other design details are FFS.
Taking into account metrics such as PAPR, capacity/flexibility, etc.
Other parameters, if any, determining SRS sequence are FFS (e.g. SRS sequence ID)

For SRS sequence generation methods in the NR system, the methods of Alt-1 and Alt-2 in Table 12 may be considered. In Alt-1, an SRS bandwidth is configured and then used to generate a sequence, but the sequence is generated irrespective of the SRS resource start position. An example of this method may be the LTE SRS sequence generation and mapping method.

A sequence that is a function of the sounding bandwidth represents the ZC sequence. In other words, in the ZC-based sequence $$x_q(m) = e^{-j\frac{\pi qm(m+1)}{N_{ZC}^{RS}}}, 0 \le m \le N_{ZC}^{RS} - 1,$$

$N_{ZC}^{RS}$ is seen as a function of bandwidth. Sequences that can be generated regardless of the SRS bandwidth may be PN-based sequences or Golay-based sequences. In addition, since the sequence generation of the ZC sequence is not changed according to the SRS mapping position, the ZC sequence is one of the sequences satisfying the method of Alt-1 in Table 12.

Figure 10:
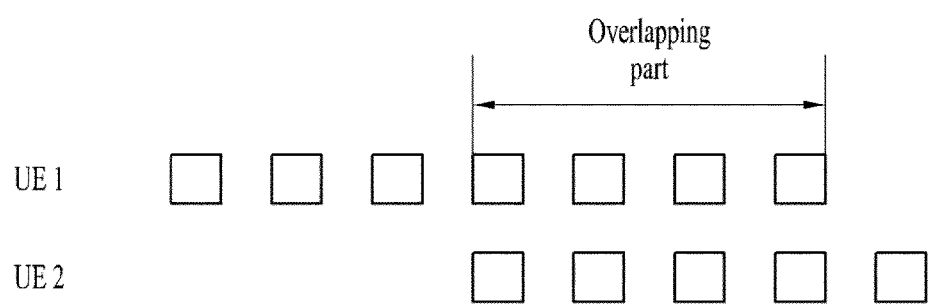
FIG. 10 is a diagram illustrating a difficulty in maintaining orthogonality for an overlapping portion in free frequency mapping when a ZC sequence is used.

FIG. 10 is a diagram illustrating a difficulty in maintaining orthogonality for an overlapping portion in free frequency mapping when a ZC sequence is used.

The LTE system allows various SRS bandwidths to be provided to each UE using the ZC sequence, and uses the transmission comb (TC) to attenuate intra-cell interference to lower degradation of channel estimation performance degradation. The LTE system also uses cyclic shift (CS) to maintain orthogonality between the ports. This is a useful sequence design method that has the lowest PAPR and is thus capable of providing more transmission power to cell-edge UEs. However, this scheme decreases the degree of freedom in resource allocation. In particular, in order to allow UEs having different SRS bandwidths to overlap with each other, it is necessary to use FDM, that is, different TCs.

The NR system requires a method for maintaining orthogonality even in overlapping of one or more partial bands due to more orthogonal UEs and TRP numbers. One more consideration in this requirement is to determine the extent to which the overlapping is allowed. When overlapping is configured to allow a degree of freedom, if the orthogonality is to be maintained with the Golay sequence or the PN sequence, the sequences of the overlapping portions may be shared and different CSs may be given. This method shows that sequence generation changes depending on the SRS arrangement position (which is considered as an example of Alt-2 in Table 12).

As an example, in the case of the Golay sequence, when different bandwidths are allocated to the respective UEs, the sequence should be nested from the overlapping position. That is, resources needed to be allocated in a nested structure between UEs having different bandwidths at a specific frequency position i to maintain orthogonality. That is, UE-1 sounding sequence=$[G^{(u,i)} \ G^{(u,i+2)} \ G^{(u,i+4)} \ G^{(u,i+6)}]$, and UE-2 sounding sequence=$[G^{(u,i)} \ G^{(u,i+2)} \ G^{(u,i+4)} \ G^{(u,i+6)} \ G^{(u,i+8)} \ G^{(u,i+10)} \ G^{(u,i+12)} \ G^{(u,i+14)}] \times e^{(-2j\pi\alpha(k))}$. Here, G(u) is time-domain cyclic shifts (CDM) of the truncated Golay sequence. This feature means that the sequences are dependent on the SRS resource position, and the method is a design method satisfying the Alt-2 method in Table 12.

However, when the ZC sequence is used, this method is not available. If two UEs with different SRS bandwidths partially overlap with each other, the sequences of overlapping portions cannot be orthogonalized. The reason is that the sequences are dependent on the bandwidth. In order to allow orthogonality, overlapping may be allowed by only a certain block, and a sequence may be configured on a block-by-block basis. Therefore, a concatenated block SRS that generates a sequence in a specific small block unit and expresses a SRS bandwidth as a group of such small blocks.

Figure 11:
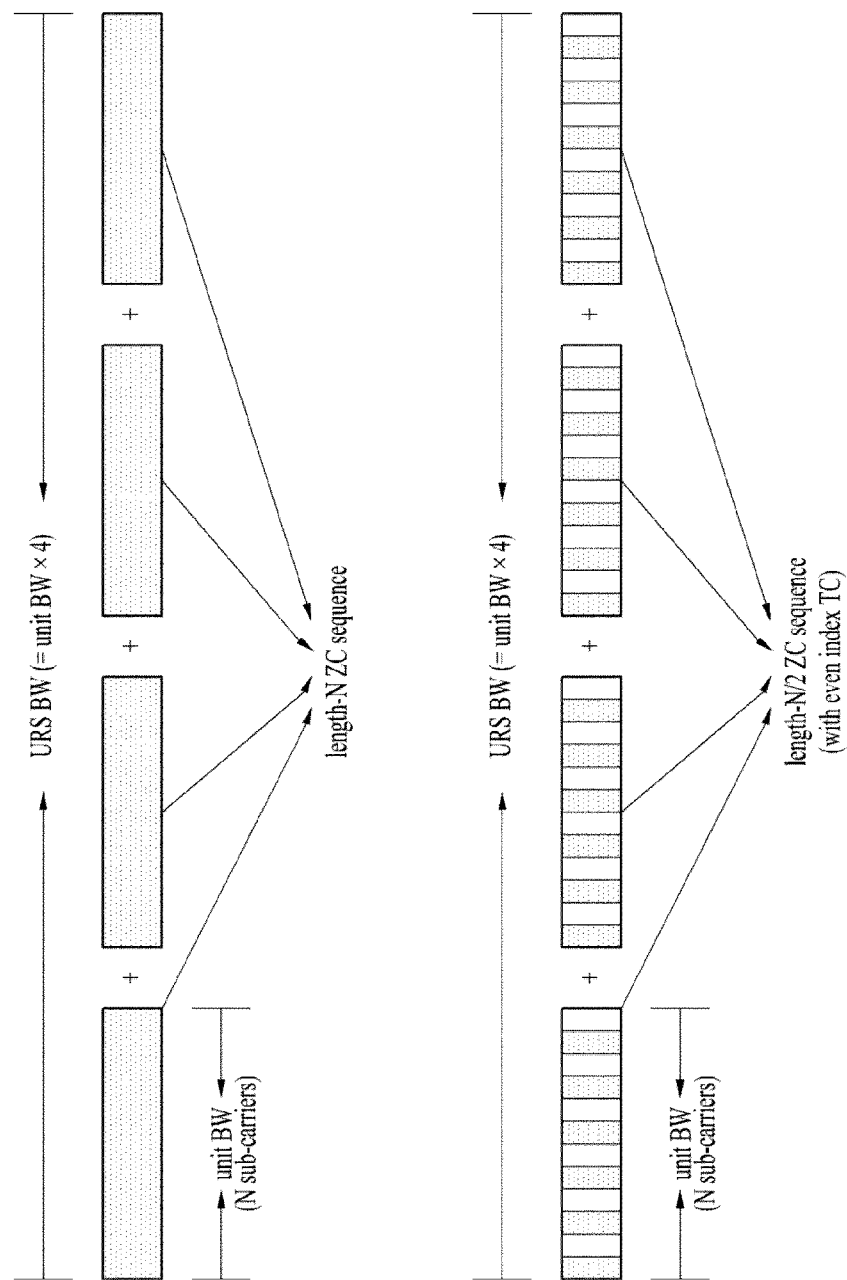
FIG. 11 is a diagram illustrating a structure of a concatenated block SRS configured in units of multiple ZC sequences.

FIG. 11 is a diagram illustrating a structure of a concatenated block SRS configured in units of multiple ZC sequences.

In the structure shown in FIG. 11, when a BS is configured to perform SRS resource allocation on the basis of a unit bandwidth (BW) starting point and orthogonally generate a BW-based sequence allocated to the unit BW for each UE, sequences may be generated regardless of the position with respect to the unit BW. As an example, when UE 1 and UE 2 have different bandwidths, if sequence generation per unit bandwidth is orthogonally specified between the two UEs, various starting positions may be configured for the UEs on a unit bandwidth basis.

Figure 12:
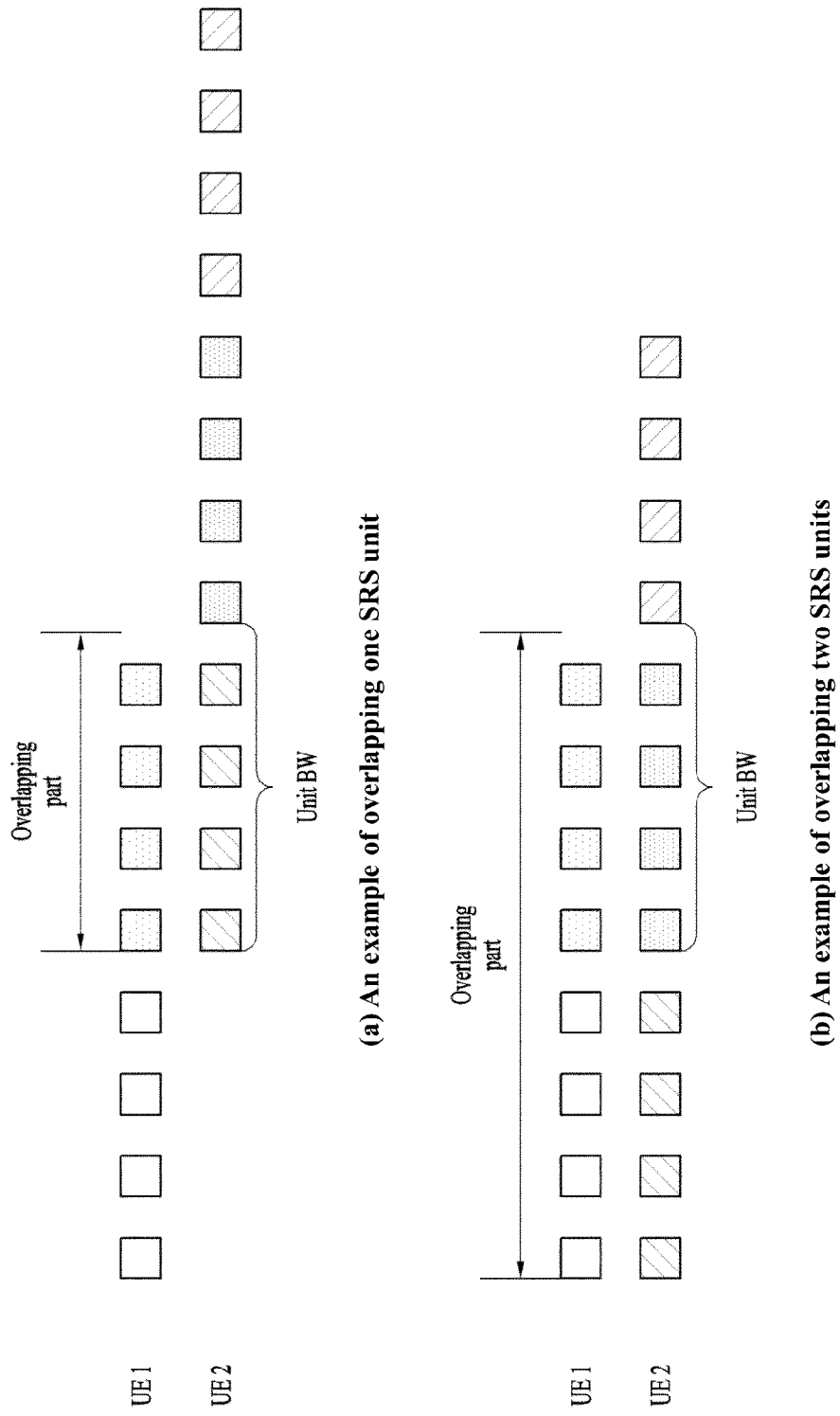
FIG. 12 illustrates SRS unit overlapping.

FIG. 12 illustrates SRS unit overlapping.

FIG. 12(a) illustrates overlapping of one SRS unit, and FIG. 12(b) illustrates overlapping of two SRS units.

The resource mapping start position can be freely specified on an SRS bandwidth unit basis. This structure may easily represent the SRS bandwidth configuration by the number of SRS bandwidth units. That is, in FIG. 12, the bandwidth of UE 1 may be represented by 2 SRS units, and the SRS bandwidth of UE 2 may be composed of 3 SRS units.

Accordingly, the concatenated SRS structure may be a structure that satisfies the Alt-1 method that may use a ZC sequence and freely allocate SRS to each UE within the unit. If the root value of the ZC sequence changes according to the SRS arrangement position in this structure, a sequence satisfying the Alt-2 structure may also be obtained.

However, there are some issues to be addressed for SRS design considering concatenated short sequence.

Since the short sequence is a BW-based sequence, the number of UEs that may overlap with each other in one BW unit is limited. That is, when the SRS BW unit length=4 RBs, and TC=2, a ZC sequence of length 24 may be generated per BW unit and 22 orthogonal sequences may be generated. That is, the BS may allocate sequences to up to 22 UEs in the BW unit in an orthogonal manner. Therefore, when a large number of UEs are supported, resource allocation and sequences allocated to the respective UEs need to be carefully designed in supporting the overlapping.

Increased overhead: A UE may have multiple BW units. When the overhead for configuration of one SRS bandwidth is L, the overhead necessary for the SRS bandwidth of the UE configured with M BW units is L*M (which is a feature of the Alt-2 method).

Proposal 1

The network may support two SRS sequence generation schemes (Alt-1 method and Alt-2 method). Of the two SRS sequence generation methods, the sequence type generated by the first SRS sequence generation method (Alt-1 method) corresponds to a sequence based on BW dependent SRS configuration (e.g., configuration for a cell-edge UE). The sequence generated by the second SRS sequence generation method corresponds to a sequence based on frequency position dependent SRS configuration for flexible resource utilization.

Here, the BW dependent SRS configuration has the following three features (which may be the same as the features of the ZC sequence).

(1) The SRS sequence is generated regardless of the SRS transmission position in the SRS BW.

(2) The PAPR is lower than that of the frequency position dependent SRS with the same BW.

(3) When orthogonal SRS resources for a plurality of UEs are allocated to different physical resource block (PRB) sets, different TC offsets are configured.

Next, the frequency position dependent SRS configuration has the following features.

(1) The SRS sequence generation method may be changed according to the SRS transmission position (for example, the SRS sequence generation method may be changed in units of 4 RBs).

(2) PAPR is higher than that of BW dependent SRS with the same BW.

(3) When a BS intends to allocate orthogonal SRS resources to a plurality of UEs in different PRB sets, the BS may configure different TC offsets for the respective PRB sets, or may use different dimensioning factors (orthogonal cover codes (OCCs), CSs, etc.) while using the same TC offset.

The network (e.g., the BS) may indicate one of the two sequence types to the UE through downlink control information (DCI), MAC Control Element (CE), or Radio Resource Control (RRC) signaling. In this case, the DCI, MAC CE, or RRC signaling may contain, besides information about the selected sequence type, 1) SRS BW configuration information about the selected SRS sequence type, 2) SRS frequency resource position (e.g., PRB position) information about the selected SRS sequence type, and 3) SRS time-domain resource position (e.g., period, slot offset) information about the selected SRS sequence type.

Upon receiving the RSRP or CQI report from the UE, the BS may determine whether the UE sending the report is a cell-edge UE or a cell-centered UE. The BS may semi-statically provide BW dependent SRS configuration or frequency position dependent SRS configuration, depending on the situation. An embodiment of the BW dependent SRS configuration may be the SRS configuration in the LTE system.

An embodiment of additional information configuration for (frequency) location-dependent SRS configuration is described below.

An example of position dependent SRS configuration is a concatenated block SRS. For the configuration of the concatenated block SRS, see the configuration shown in FIG. 11. N (4 in FIG. 14) SRS units (or unit BWs) may be configured within the entire SRS BW. The UE may generate orthogonal sequences each having an SRS unit length, and thus has an SRS structure allowing partial overlapping. That is, if the same SRS unit length is configured for each UE, the BS may allocate the sequences in the SRS unit to the UEs in a low-correlated manner. Each UE may be assigned an orthogonal SRS by an indication of an SRS unit index or the like allocated thereto.

If the sequence generation method changes according to the position of each SRS unit, the UE may generate an SRS sequence by a corresponding sequence generation method for each SRS unit according to the frequency position dependent SRS configuration. Sequence generation methods in a partially overlapping SRS unit may include a method in which the same sequence of the overlapping SRS unit is received in the case of Golay/PN and different CSs/OCCs are provided, and a method in which a low correlated sequence for a UE assigned the overlapping SRS unit is generated in the case of ZC. The concatenated SRS configuration method may be classified into SRS BW configuration, SRS frequency resource position configuration, SRS slot or SRS subframe configuration.

Proposal 2

In the frequency position dependent SRS configuration, parameters configured through the MAC-CE or DCI for dynamic configuration may be used together with the parameters semi-statically configured through RRC signaling.

Transmission Options for Frequency Position Dependent SRS Configuration Information Option 1: The BS may semi-statically configure the SRS BW information (e.g., the number of SRS PRBs, the TC value), and statically configure the SRS position information (e.g., a PRB index to which the SRS is not allocated/a PRB index to which the SRS is allocated, a TC offset value).

Option 2: The BS semi-statically configure the SRS position information (e.g., a PRB index to which the SRS is not allocated, a PRB index to which the SRS is allocated, and a TC offset value), and dynamically configure the SRS BW information (e.g., the number of SRS PRBs, a TC value).

Option 3: When the BS semi-statically configures the SRS position information, it may semi-statistically configure a parameter subset and dynamically configure the remaining subset among the SRS BW information parameters. For example, the number of SRS PRBs may be statically configured, and the TC value may be dynamically configure and. Conversely, the number of SRS PRBs may be dynamically configured, and the TC value may be statically configured.

Option 4: When the BS dynamically configures the SRS position information, it may semi-statically configure the parameter subset and dynamically configure the remaining subset among the SRS BW information parameters. For example, the number of SRS PRBs may be statically configured, and the TC value may be dynamically configured. Conversely, the number of SRS PRBs may be dynamically configured, and the TC value may be statically configured.

Option 5: When the BS semi-statically configures the SRS BW information, the parameter subset may be semi-statically configured and the remaining subset may be dynamically configured among the SRS position information parameters. For example, a PRB index to which the SRS is not allocated/a PRB index to which the SRS is allocated may be semi-statically configured, and the TC offset value may be dynamically configured. Conversely, the PRB index to which the SRS is not allocated/the PRB index to which the SRS is allocated may be dynamically configured, and the TC offset value may be semi-statically configured.

Option 6: When the BS dynamically configures the SRS bandwidth information, the parameter subset may be semi-statically configured and the remaining subset may be dynamically configured among the SRS position information parameters. For example, a PRB index to which the SRS is not allocated/a PRB index to which the SRS is allocated may be semi-statically configured, and the TC offset value may be dynamically configured. Conversely, the PRB index to which the SRS is not allocated/the PRB index to which the SRS is allocated may be dynamically configured, and the TC offset value may be semi-statically configured.

Option 7: The BS may configure the candidate sets for SRS bandwidth and/or SRS position through RRC signaling and dynamically indicates one or more of the candidate sets through DCI or MAC-CE to dynamically transmit information about the SRS bandwidth and/or the SRS position (see Table 13 below).

An example of frequency position dependent SRS bandwidth configuration (e.g., a concatenated block SRS) is described below according to an embodiment.

SRS Bandwidth Configuration

First, a generation configuration should be established for the SRS bandwidth unit. When the ZC sequence is used, $M_{sc}^{SRS\_unit}$ may define the length of a SRS unit sequence and be used to generate $\bar{r}_{u,v}(0), \ldots, \bar{r}_{u,v}(M_{sc}^{SRS\_unit}-1)$. Here, $\bar{r}_{u,v}(n)=x_q(n \bmod N_{ZC}^{RS})$, $$0 \le n < M_{sc}^{SRS\_unit}, \text{ and}$$

$$x_q(m) = e^{-j\frac{\pi qm(m+1)}{N_{ZC}^{RS}}}, 0 \le m \le N_{ZC}^{RS} - 1.$$

Here, $N_{ZC}^{RS}$ is the largest prime number which satisfies $N_{ZC}^{RS} < M_{sc}^{SRS\_unit}$, and the root value $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

may be represented using the group number u and the base sequence number v.

In order to satisfy the equation of $\bar{q}$, one SRS unit length $M_{sc}^{SRS\_unit}$ needs to ensure a length at which at least 30 kinds of orthogonal sequences can be generated. Of course, it may have another value.

As an example, when $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/23$$

is used, $M_{sc}^{SRS\_unit}$ that ensures 22 kinds of sequences should be set. In this case, $M_{sc}^{SRS\_unit}$ may be 24. Sequences according to the SRS unit (or the BW unit) may be generated using a BW independent sequence such as a Golay sequence or a PN sequence.

The SRS unit length may be determined according to the unit BW configuration in the highly layer. If the transmission comb (TC) of one unit is 4, and the unit BW is set to 8 RBs (96 REs), $M_{sc}^{SRS\_unit}$ may be expressed as $M_{sc}^{SRS\_unit}$=96/4=24. Therefore, the SRS BW configuration may be represented by the number of consecutive SRS units. As an example, if the SRS unit BW is 8 RBs, and the SRS BW is configured with 4 consecutive SRS units, the SRS BW may be represented by 32 RBs. If the SRS unit BW is 8RBs when the total uplink BW is 200 RBs, the SRS BW may be composed of 25 units, which may be represented in 5 bits. When a unit of a non-consecutive SRS unit is present in the SRS BW, the number of SRS units may be used to represent the SRS BW, and a value indicating a non-consecutive region may be provided.

Figure 13:
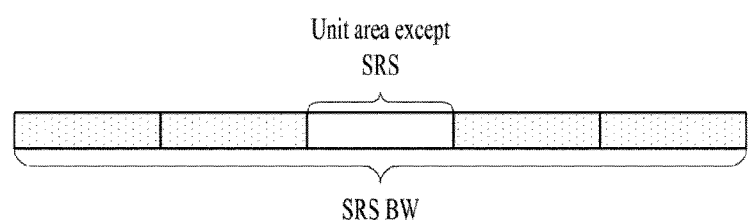
FIG. 13 illustrates non-consecutive SRS bandwidth configuration.

FIG. 13 illustrates discontinuous SRS bandwidth configuration.

In an embodiment, when an uplink BW is 200 RBs and the size of the unit BW is 8 RBs, if the SRS BW is 40 RBs, 5 may be provided as an SRS BW value. Here, if the third SRS unit is not assigned the SRS as shown in FIG. 13, 3 may be provided to indicate the SRS unit that is not assigned the SRS. In the example of FIG. 13, the SRS BW is composed of 5 SRS units and the SRS is not allocated to the third SRS unit.

Proposal 2-1

The SRS BW configuration for a concatenated block SRS may be represented by the sequence configuration for each SRS unit BW and the number of SRS units. In addition, for each BW configuration, an SRS unit index at which the SRS is not configured may be configured or parameters capable of indicating the SRS unit index at which the SRS is not configured may be used, in order to support non-consecutive SRS configuration. The BS may transmit, to the UE, information about the SRS unit index at which the SRS is not configured or the parameters capable of indicating the SRS unit index at which the SRS is not configured semi-statically through RC signaling or dynamically through the MAC-CE or DCI.

Options for Transmission of Concatenated Block SRS BW Configuration Information

Option 1: The BS may semi-statically configure the SRS BW length, and dynamically configure information about the position/(PRB) index to which the SRS unit is not allocated. The BS may transmit the information about the SRS BW length to the UE through RRC signaling, and the information about the position/(PRB) index to which the SRS unit is not allocated to the UE through DCI or MAC-CE.

Option 2: The BS dynamically configure the SRS BW length, and semi-statically configure information about the position/(PRB) index to which the SRS unit is not allocated. The BS may transmit the information about the SRS BW length to the UE through DCI or MAC-CE, and the information about the position/(PRB) index to which the SRS unit is not allocated to the UE through RRC signaling.

Option 3: The BS may semi-statically transmit the candidate sets for the SRS BW to the UE through RRC signaling, and may indicate one or more of the candidate sets and dynamically transmit information about the SRS BW to the UE through DCI or MAC-CE (see Table 13 below).

Figure 14:
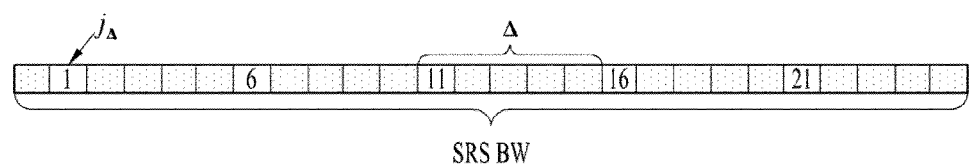
FIG. 14 illustrates non-consecutive SRS bandwidth configuration.

FIG. 14 illustrates non-consecutive SRS bandwidth configuration.

Referring to FIG. 14, the SRS BW is composed of 25 SRS units. If a non-contiguous SRS BW configuration is represented using a resource offset Δ to which the SRS unit is not allocated and a starting position to which the SRS unit is not allocated, the payload may be reduced. As an example, if the uplink BW is 200 RBs and the SRS unit is 8 RBs, the number of SRS units J is 25. If no SRS unit is assigned to 5 SRS unit parts (e.g., the SRS unit indexes 1, 6, 11, 16, and 21 in FIG. 14), the index representing one SRS unit may be indicated in 5 bits (to express 25 indexes), and a total of 25 bits is required. On the other hand, three units to which the SRS unit is not allocated may be represented using 5 bits for indicating the position index $j_Δ$=1 where the first SRS unit is not allocated and 3 bits for indicating the offset Δ=5.

Table 13 shows an example of SRS BW configuration for a concatenated block SRS.

TABLE 13

| SRS bandwidth configuration | SRS-unit BW $N_{RB}^{SRS\_unit}$ = 4 | | | SRS-unit BW $N_{RB}^{SRS\_unit}$ = 8 | | |
|---|---|---|---|---|---|---|
| $C_{SRS}$ | SRS BW J | $j_Δ$ | Δ | SRS BW J | $j_Δ$ | Δ |
| 0 | 2 | 0 | 2 | 2 | 0 | 2 |
| 1 | 2 | 1 | 2 | 2 | 1 | 2 |
| 2 | 4 | 0 | 4 | 4 | 0 | 4 |
| 3 | 4 | 2 | 4 | 4 | 2 | 4 |
| 4 | 8 | 0 | 8 | 8 | 0 | 8 |
| 5 | 8 | 1 | 8 | 8 | 1 | 8 |
| 6 | 16 | 0 | 16 | 16 | 0 | 16 |
| 7 | 16 | 1 | 16 | 16 | 1 | 16 |

In another embodiment, the BS may indicate to the UE a position to which the SRS unit is not allocated, using a bitmap. In the example of FIG. 14, the parts {1, 6, 11, 16, 21} may be represented using a bitmap and indicated by 0100001000010000100001000, which is 25 bits.

Example of Configuration of an SRS Resource Position in the Frequency Domain in Frequency Position Dependent SRS Configuration SRS resource position configuration in the frequency domain (concatenated block SRS)

The SRS resource position configuration in the frequency domain may be represented by a value including an SRS unit index. That is, it may be represented by $k_0^{(p)}=j×N_{RB}^{SRS\_unit}+\bar{k}_0^{(p)}$, where $\bar{k}_0^{(p)}$ denotes the starting position where the SRS resource is allocated, and j denotes the SRS unit starting index. As an example, if a specific SRS unit starting index is given as j=6 and the starting RE position index is $\bar{k}_0^{(p)}$=1, $k_0^{(p)}$ may be represented as $k_0^{(p)}=j×N_{RB}^{SRS\_unit}+\bar{k}_0^{(p)}$ and thus a specific sequence unit may be mapped to the position of $k_0^{(p)}=6×N_{RB}^{SRS\_unit}+1$.

Generation of each sequence may be represented as a function of the SRS unit starting index j. For the ZC sequence, the root value q may be represented as a function of j. That is, it may be expressed as $$q(j) = \lfloor \bar{q}(j) + 1/2 \rfloor + v \cdot (-1)^{\lfloor 2\bar{q}(j) \rfloor}$$

$$\bar{q}(j) = N_{ZC}^{RS} \cdot (u(j) + 1)/31.$$

u(j) may be configured to be inter-cell low-correlated. Accordingly, when the UE generates each sequence as a function of an SRS unit starting index, control of intra-cell or inter-cell interference between SRS units may be facilitated. The network may provide the group number u(j) so as to be low-correlated in the serving cell and the neighboring cell. In addition, the network may be configured to generate sequences such that the units $j_{k-1}$ and $j_{k+1}$ on both sides of the k-th j unit position $j_k$ or neighboring units $\{j_{k-\alpha}, \ldots, j_{k-1}, j_{k+1}, \ldots, j_{k+\alpha}\}$ are low-correlated with $u(j_k)$.

For the Golay sequence or the PN sequence, when the entire sequence is composed of N units, namely, $\{G(j_0), G(j_1), \ldots, G(j_k), \ldots, G(j_N)\}$, some $\alpha$ UEs may be configured to have different CDMs in order to be assigned resources at $j_k$ and allow overlapping (e.g., $G(j_k)e^{j2\pi\beta_0}$ $G(j_k)e^{j2\pi\beta_1}, \ldots, G(j_k)e^{j2\pi\beta_\alpha}$).

Proposal 2-2

The BS may transmit information related to the configuration of the resource position of the concatenated block SRS in the frequency domain to the UE semi-statically through RRC signaling or dynamically through MAC-CE or DCI.

Options for Transmission of Information Related to Configuration of the Resource Position of Concatenated Block SRS in the Frequency Domain Option 1: The BS may semi-statically configure the allocation starting position of SRS resources, and dynamically configure the starting position/index information about each SRS unit. The BS may transmit the information about the allocation starting position of SRS resources to the UE through RRC signaling, and may transmit the starting position/index information about each SRS unit to the UE through the DCI or MAC-CE.

Option 2: The BS may be semi-statically configure the starting position/index information about each SRS unit and dynamically configure the allocation starting position of SRS resources. The BS may transmit the starting position/index information about each SRS unit to the UE through RRC signaling, and may transmit information about the allocation starting position of the SRS resources to the UE through the DCI or MAC-CE.

Option 3: The BS may configure candidate sets for configuration of the resource position in the frequency domain for the UE through RRC signaling and dynamically indicate one or more candidate sets selected from among the candidate sets through DCI or MAC-CE (see Table 13).

Proposal 3

After calculating the link budget obtained through the downlink RS or the like, the UE may transmit, to the BS, a message for requesting/reporting a BW dependent SRS configuration (for, for example, a cell edge UE or the like) or a frequency position dependent SRS configuration (for, for example, a cell-centered UE or the like). After receiving this message, the BS may indicate information about the SRS configuration to the UE.

Proposal 4

The BS may semi-statically configure information related to the frequency position dependent SRS slot/subframe configuration and transmit the same to the UE through RRC signaling or may dynamically configure and transmit the same to the UE through MAC-CE or DCI.

SRS Slot/Subframe Configuration

The BS may establish an SRS slot/subframe configuration for UEs (cell-edge UEs and the BW dependent SRS) for which low PAPR is required and UEs (cell-centered UEs and the frequency position dependent SRS) for which low PAPR is not required separately, and provide the same to each UE, or may establish the same configuration regardless of the UEs and transmit the same to each UE.

1. In a case where the BS establishes an SRS configuration by distinguishing between the BW dependent SRS and the frequency position dependent SRS.

The BS may separate the SRS configuration for the legacy LTE system and the configuration for the frequency dependent SRS to establish SRS configuration according to the slot/subframe in which the corresponding SRS is triggered. That is, two SRS slot/subframe configurations are required.

In an embodiment, when the slot/subframe configuration in which the bandwidth dependent SRS (as in the LTE system) is $I_{SRS}=1$ in Table 5 and the slot/subframe configuration in which the frequency position dependent SRS is transmitted is $I_{SRS}=4$, if the number of slots/subframes in a radio frame having an index of $n_f=1$ according to the equation $$\underset{k_{SRS}}{\arg}[(N_{slot/subframe} \cdot n_f + k_{SRS} - T_{offset}) \bmod M_{SRS} = 0]$$

is $N_{slot/subframe}=20$, the slot/subframe in which each SRS is transmitted is given as follows.

The slot/subframe index at which the BW dependent SRS is transmitted is $k_{SRS}=\{1,3,5,7,9, \ldots, 19\}$.

The slot/subframe index at which the frequency position dependent SRS is transmitted is $k_{SRS}=\{2,7,12,17\}$.

If configurations of two SRS (BW dependent SRS and frequency position dependent SRS) are simultaneously generated in the same slot/subframe, any of the followings may be selected.

When configurations of two SRS (BW dependent SRS and frequency position dependent SRS) are simultaneously generated in the same slot/subframe, the UE may transmit only the BW dependent SRS in the slot/subframe. The UE may drop transmission of the frequent position dependent SRS in the slot/subframe.

When configurations of two SRS (BW dependent SRS and frequency position dependent SRS) are simultaneously generated in the same slot/subframe, the UE may transmit only the frequent position dependent SRS in the slot/subframe. The UE may drop transmission of the BW dependent SRS in the slot/subframe.

When configurations of two SRS (BW dependent SRS and frequency position dependent SRS) are simultaneously generated in the same slot/subframe, the UE may transmit both the BW dependent SRS and the frequency position dependent SRS in the slot/subframe.

2. In a case where the BS configures a slot/subframe without distinguishing between BW dependent SRS configuration/frequent position dependent SRS configuration The BS provides only the SRS transmission slot/subframe positions to the UEs (see legacy LTE).

Each UE needs to receive, from the BS from the BS, signaling indicating whether a BW dependent SRS or a frequency-dependent SRS is configured therefor.

Alternatively, the UE may transparently select a BW dependent SRS configuration or a frequency-dependent SRS configuration (possibly in the case of a link with downlink reciprocity). The BS may receive feedback information such as PMI and CQI from the corresponding UE and then determine whether the SRS configuration for the UE is a bandwidth dependent SRS configuration or a frequency position dependent SRS configuration.

As an embodiment, the payload required for BW dependent SRS configuration is compared with the payload required for a concatenated block SRS configuration in Table 14. Note that, when concatenated block SRS is configured, the number of bits similar to that in the LTE system is set. Table 14 shows an example of comparison between the payloads for SRS configurations (Note that concatenated block configuration is based on the LTE payload).

TABLE 14

|  | BW dependent based SRS configuration (LTE) | Concatenated block based SRS configuration |
| --- | --- | --- |
| SRS bandwidth configuration on $C_{SRS}$ | 3 bits (0~7) | 3 bits (see Table 5-1 (possibly more bits)) + 1 bit (see Table 5-1; SRS unit BW number (possibly a greater number)) |
| SRS slot/subframe configuration | 4 bits (0~15) | 4 bits (0~15) |
| Frequency resource position configuration | Configuration with $n_{RRC}$ (0~23) and TC offset $\bar{k}_{TC} \in \{0, 1, \ldots, K_{TC} - 1\}$ 7 bits (5 bits for $n_{RRC}$ + 2 bits for $K_{TC} = 4$) | Configuration with J and TC offset $\bar{k}_{TC} \in \{0, 1, \ldots, K_{TC} - 1\}$ 7 bits (5 bits for J (2~28) + 2 bits for $K_{TC} = 4$) |
| Transmission Comb number | Since it is one of $K_{TC} = \{0, 2, 4\}$, 2 bits | 2 bits (same as LTE) |
| Cyclic Shift number | When 3 bits ($n_{SRS}^{cs,max} = 8$), $K_{TC} = 2$ When 4 bits ($n_{SRS}^{cs,max} = 12$), $K_{TC} = \{0,4\}$ | When 3 bits ($n_{SRS}^{cs,max} = 8$), $K_{TC} = 2$ When 4 bits ($n_{SRS}^{cs,max} = 12$), $K_{TC} = \{0, 4\}$ |
| Total payload (excluding hopping related information and configuration of SRS consecutive symbols) | 19~20 bits | 20~21 bits |

The payload result as illustrated in Table 14 may vary depending on how to configure a concatenated block SRS. However, if the payload is determined by referring to the LTE case, the difference in size between the determined payload and the payload required for the LTE SRS configuration may not be large. The BS may semi-statically configure the bandwidth dependent SRS or the concatenated block SRS through higher layer signaling (e.g., RRC signaling).

Proposal 5

For dynamic configuration, the BS may configure a parameter set for a BW configuration of the frequency position dependent SRS, a resource position configuration of the SRS in the frequency domain, and an SRS slot/subframe position configuration in the higher layer, and dynamically indicate the indexes of the parameter sets through DCI or MAC-CE.

Table 15 below exemplarily shows configuration of parameter sets and configuration of parameter set indexes.

TABLE 15

| Concatenated block SRS field | SRS bandwidth configuration $C_{SRS}$ | Frequency response position configuration | SRS slot/subframe configuration |
| --- | --- | --- | --- |
| '00' | 2 | 0 | J = 2, $\bar{k}_{TC} = 0$ |
| '01' | 4 | 2 | J = 4, $\bar{k}_{TC} = 1$ |
| '10' | 5 | 4 | J = 8, $\bar{k}_{TC} = 0$ |
| '11' | 6 | 6 | J = 10, $\bar{k}_{TC} = 1$ |

As shown in Table 15, the BS may transmit a concatenated block SRS field in the DCI or the like to indicate, to the UE, information about the SRS bandwidth configuration, the frequency resource position configuration, and the SRS slot/subframe configuration. The BS may reduce signaling overhead associated with transmission of the SRS configurations by simply providing the concatenated block SRS (request) field through the DCI.

Considering DCS transmission for the individual parameters in order for the BS to support more dynamic SRS configurations, the configuration elements may be UE-specific as the payload sizes and configuration elements needed for the respective SRS configurations may be different from each other. However, if the payload size and configuration elements for SRS configuration are UE-specific, signaling overhead may be increased. Accordingly, the BS may reduce the signaling overhead by distinguishing the cell-specific configuration, the UE-group-specific configuration, and the UE-specific configuration and transmitting the configuration information through the DCI.

Proposal 6

The BS may UE-group-specifically establish SRS configuration to provide specific UEs (UEs with a received power level lower than a predetermined threshold or UEs with a CQI level lower than a specific threshold (mainly cell-edge UEs)) with a bandwidth dependent SRS configuration and provide a frequency position dependent SRS configuration for UEs with a received power level higher than the predetermined threshold or UEs with a CQI level higher than the specified threshold (mainly UEs located at the center of the cell)).

Proposal 6-1

The UEs with a received power level higher than the predetermined threshold or UEs with a CQI level higher than the specified threshold (mainly UEs located at the center of the cell)) may use both the frequency position dependent SRS configuration and the bandwidth dependent SRS configuration depending on the situation. For example, a UE multiplexing and transmitting an uplink control channel and an SRS may use both the frequency position dependent SRS configuration and the bandwidth dependent SRS configuration.

Proposal 6-2

Each UE has a UE group RNTI for receiving/acquiring a UE-group-specific DCI. Therefore, each UE may perform UE-group-specific SRS transmission. For example, if both the bandwidth dependent SRS configuration and the frequency position dependent SRS configurations are needed, the UE may obtain the RNTIs for the two configurations through higher layer signaling or the like.

Proposal 7

The UE transmits UE category information to the BS, and the BS then indicates a bandwidth dependent SRS configuration or a frequency position dependent SRS configuration to the UE. The UE category information may include the following four kinds of information.

Information about the uplink multiplexing method (e.g., DFTs-OFDM, CP-OFDM) supported by the corresponding UE;

Information about the transmission power supported by the corresponding UE;

Information about the number of multiple numerologies supported by the corresponding UE; and Information about uplink allocatable bandwidth supported by the corresponding UE.

If a UE reports a UE category indicating use of DFTs-OFDM for uplink transmission, the BS may indicate a bandwidth dependent SRS configuration to the specific UE, determining that the UE requires a low PAPR and may. On the other hand, if the UE reports a UE category indicating use of CP-OFDM for uplink transmission, the BS may recognize that UE is not a UE requiring a low PAPR and consider both the bandwidth dependent SRS configuration and the frequency position dependent SRS configuration as configurations for the UE. Here, if flexible resource utilization is required, the BS may provide/indicate the frequency position dependent SRS configuration to the UE.

When the UE reports a UE category indicating that the maximum transmission power supported by the UE is $\Gamma_{max}$, the BS estimates the reported CQI or Reference Signals Received Power (RSRP) level and PathLoss (PL). The estimated uplink transmission power after the PL estimation may be greater than $\Gamma_{max}$. For the bandwidth dependent SRS transmission of the UE, if the uplink transmission power estimated in using the power backoff is less than $\Gamma_{max}$, the BS may select a bandwidth dependent SRS as the SRS transmission configuration, and configure/indicate a bandwidth dependent SRS for the UE. Otherwise, the BS may indicate the bandwidth independent SRS configuration/frequency position dependent SRS configuration to the UE depending on the flexible resource utilization.

When the UE category reported by the UE indicates that the number of supported numerologies is large, it may be more advantageous for the BS to indicate/provide frequency position dependent SRS configuration to the UE than to indicate/provide the bandwidth dependent SRS configuration. That is, if there are multiple numerologies for uplink, the PAPR requirement of the UE may be low.

When the UE reports a UE category indicating that the supported uplink bandwidth size corresponds to a wideband, the entire uplink bandwidth may be configured and generated with partial bands. Even if there is no information about whether the entire wideband can be used for transmission of the SRS or whether entire bandwidth can be used for transmission in combination of partial bandwidths, the BS may select an SRS configuration based on the UE category and indicate the selected SRS configuration to the UE because information indicating the uplink bandwidth can be included in the UE category.

As such, when a bandwidth dependent SRS configuration (which is configured as a bandwidth dependent SRS in the LTE system) and a frequency position dependent SRS configuration coexist on the network, a cell-edge UE may use a bandwidth dependent SRS configuration method with a low PAPR due to the limited transmission power, and a cell-centered UE may use frequency position dependent SRS configuration for flexible resource utilization.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method for transmitting SRS in a wireless communication system and a terminal therefor may be used industrially in various wireless communication systems such as the 3GPP LTE/LTE-A systems and the 5G communication system.

The invention claimed is:

1. A method for transmitting a Sounding Reference Symbol (SRS) by a user equipment (UE) in a wireless communication system, the method comprising:
receiving, from a base station, SRS configuration information including information indicating an SRS sequence type for generation of an SRS sequence of the UE;
generating an SRS sequence based on the indicated SRS sequence generation type; and transmitting, to the base station, an SRS on a corresponding resource, wherein the generated SRS sequence is applied to the SRS,
wherein the indicated SRS sequence generation type is a first type for generating an SRS sequence in the same manner regardless of an SRS transmission position in an SRS bandwidth or a second type for generating the SRS sequence in different manners according to the SRS transmission position in the SRS bandwidth, and wherein, based on the indicated SRS sequence generation type is the second type, the SRS configuration information includes the SRS bandwidth, an index of a Physical Resource Block (PRB), to which the SRS is not allocated, and a transmission comb offset value.

2. The method of claim 1, further comprising:

transmitting, to the base station, strength information for a received signal or Channel Quality Information (CQI), wherein the SRS sequence generation type is indicated based on the strength information for the received signal or the CQI.

3. The method of claim 1, further comprising:

transmitting, to the base station, category information about the UE, wherein the category information for the UE comprises at least one of information for uplink multiplexing supported by the UE, information for a transmission power supported by the UE, the number of multiple numerologies supported by the UE, or information for an uplink allocable bandwidth supported by the UE, wherein the SRS sequence generation type is indicated based on category information about the UE.

4. The method of claim 1, wherein the SRS configuration information is received through Downlink Control Information (DCI), a MAC Control Element (CE), or a Radio Resource Control (RRC) signal.

5. The method of claim 1, wherein, in a state that the UE is located at a cell edge, the indicated SRS sequence generation type is the first type.

6. The method of claim 1, wherein, in a state that the UE is located at a center of a cell, the indicated SRS sequence generation type is the second type.

7. A user equipment (UE) for transmitting a Sounding Reference Symbol (SRS) in a wireless communication system, the UE comprising:

a receiver configured to receive, from a base station, SRS configuration information including information indicating an SRS sequence type for generation of an SRS sequence of the UE, a processor configured to generate an SRS sequence based on the indicated SRS sequence generation type; and a transmitter configured to transmit, to the base station, an SRS on a corresponding resource, wherein the generated SRS sequence is applied to the SRS, wherein the indicated SRS sequence generation type is a first type for generating an SRS sequence in the same manner regardless of an SRS transmission position in an SRS bandwidth or a second type for generating the SRS sequence in different manners according to the SRS transmission position in the SRS bandwidth, and wherein, based on the indicated SRS sequence generation type is the second type, the SRS configuration information includes the SRS bandwidth, an index of a Physical Resource Block (PRB), to which the SRS is not allocated, and a transmission comb offset value.

8. The UE of claim 7, wherein the transmitter is configured to transmit, to the base station, strength information for a received signal or channel quality information (CQI), wherein the SRS sequence generation type is indicated based on the strength information for the received signal or the CQI.

9. The UE of claim 7, wherein the SRS configuration information is received through Downlink Control Information (DCI), a MAC Control Element (CE), or a Radio Resource Control (RRC) signal.

* * * * *